(12) United States Patent
Oganezov et al.

(10) Patent No.: US 11,238,013 B2
(45) Date of Patent: Feb. 1, 2022

(54) SCALABLE ACCESS TO SHARED FILES IN A DISTRIBUTED SYSTEM

(71) Applicant: INTEL CORPORATION, Santa Clara, CA (US)

(72) Inventors: Alexander Oganezov, Portland, OR (US); Jeffrey V. Olivier, Longmont, CO (US); Christopher Holguin, Denver, CO (US)

(73) Assignee: INTEL CORPORATION, Santa Clara, CA (US)

( * ) Notice: Subject to any disclaimer, the term of this patent is extended or adjusted under 35 U.S.C. 154(b) by 321 days.

(21) Appl. No.: 16/020,906

(22) Filed: Jun. 27, 2018

(65) Prior Publication Data

US 2019/0042592 A1 Feb. 7, 2019

(51) Int. Cl.
G06F 16/176 (2019.01)
G06F 16/51 (2019.01)
G06F 16/901 (2019.01)
G06F 9/4401 (2018.01)

(52) U.S. Cl.
CPC .......... *G06F 16/176* (2019.01); *G06F 9/4416* (2013.01); *G06F 16/51* (2019.01); *G06F 16/9027* (2019.01)

(58) Field of Classification Search
CPC ................................. G06F 16/176; G06F 7/00
USPC ................................................. 707/694, 662
See application file for complete search history.

(56) References Cited

U.S. PATENT DOCUMENTS

| 8,380,676 B1* | 2/2013 | Eastham | G06F 16/125 |
| | | | 707/662 |
| 10,404,708 B2* | 9/2019 | Capone | G06F 21/60 |
| 10,409,781 B2* | 9/2019 | Malhotra | G06F 16/2443 |
| 10,657,019 B1* | 5/2020 | Chopra | G06F 11/3006 |
| 2004/0205152 A1* | 10/2004 | Yasuda | G06F 16/184 |
| | | | 709/217 |
| 2009/0067440 A1* | 3/2009 | Chadda | H04L 45/74 |
| | | | 370/401 |
| 2016/0124764 A1* | 5/2016 | Nithrakashyap | G06F 11/1446 |
| | | | 718/1 |
| 2016/0360282 A1* | 12/2016 | Graham | H04L 63/00 |
| 2019/0050296 A1* | 2/2019 | Luo | G06F 11/1458 |
| 2019/0095491 A1* | 3/2019 | Bhattacharjee | G06F 16/2433 |

* cited by examiner

*Primary Examiner* — Giovanna B Colan
(74) *Attorney, Agent, or Firm* — Kacvinsky Daisak Bluni PLLC

(57) ABSTRACT

Logic may pre-populate cache of compute nodes allocated to a user's session. Logic may access an image file of a global filesystem, the image file to comprise a first set of one or more files associated with a user session and a second set of one or more files upon which execution of the first set will depend. Logic may store the image file in local data storage of each compute node of a spanning tree of compute nodes allocated for the user session. Logic may unpack the image file based on the data. Logic may configure the local environment of each compute node in the spanning tree to identify a location in local memory of each of the files. And logic may initiate execution of a local filesystem service in each of the compute nodes of the spanning tree.

25 Claims, 10 Drawing Sheets

SCALABLE ACCESS TO SHARED FILES IN A DISTRIBUTED SYSTEM

GOVERNMENT RIGHTS

This invention was made with Government support under contract number B609815 awarded by the Department of Energy. The Government has certain rights in this invention.

TECHNICAL FIELD

Embodiments described herein are generally directed to shared file access, and more particularly, to scalable access to shared files in a distributed system with cache pre-population.

BACKGROUND

In upcoming exascale computing systems, where there are potentially hundreds of thousands of compute nodes, one of the challenges is the distribution of shared files, or dynamic shared object (DSO) files, such as executables, libraries, settings, data files, and others across all compute nodes. A global filesystem might be used for such sharing of data; however, the global filesystem creates network and computational hotspots when multiple compute nodes attempt to access the global shared file system at the same time.

To illustrate, a single load of an executable file can result in hundreds of accesses to the global filesystem on just one of those nodes because a loader, such as a GNU loader, will fetch all the file dependencies for the executable file prior to execution of the application. For instance, execution of the executable file may depend on access to other files such as other executables, libraries, settings, data files, and others. Most processes load the same libraries they depend on simultaneously. For exascale computing systems, tens of thousands of nodes may perform the same access pattern concurrently in parallel. Modern supercomputers typically lack node-local storage, and even large parallel file systems cannot quickly service millions or billions of small, simultaneous input-output (I/O) requests. As a result, loading an application can initiate an I/O storm that manifests much like a denial-of-service attack.

Current solutions may assign each file in the global filesystem to a master node. The master node processes any access to that file and the master node, as well as all nodes between the requestor and the master node, cache the file locally throughout the requestor's login session. If a second requestor requests the same file while the file is cached locally by the master node or a node between the master node and the second requestor, the second requestor can obtain the file from a compute node other than the global filesystem.

DETAILED DESCRIPTION OF EMBODIMENTS

Figure 1A:
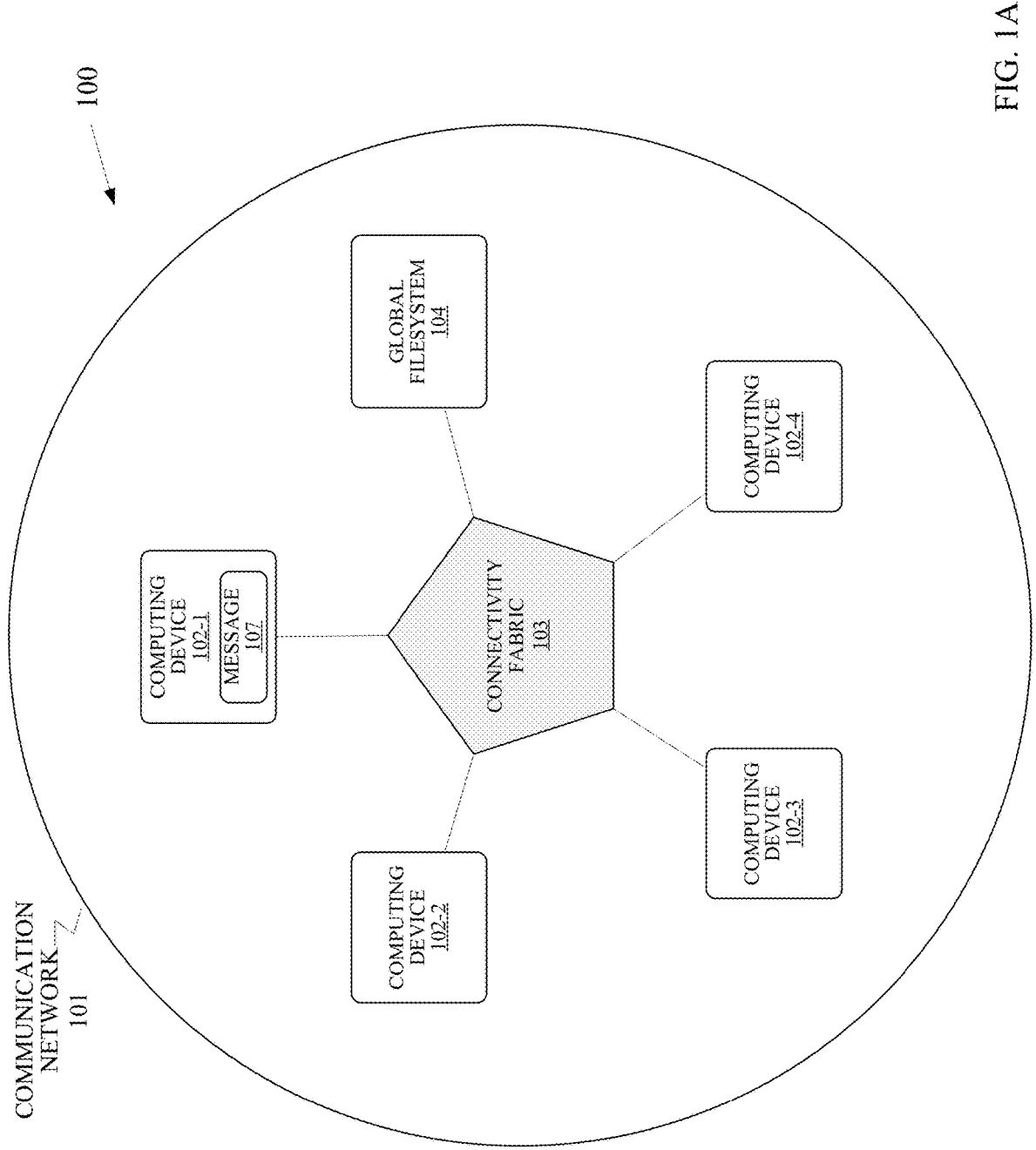
FIG. 1A depicts an embodiment of a system including multiple computing nodes of a distributed system interconnected with a communication network.

The following is a detailed description of embodiments depicted in the drawings. The detailed description covers all modifications, equivalents, and alternatives falling within the appended claims.

A dynamic loader, also called a dynamic linker, is responsible for locating object code and making it available within a process's address space. These actions make the object code's subroutines callable by the main program. Dynamic linking and loading first appeared to share common code between processes. For this reason, dynamically linked libraries are also often called shared libraries, and any object files that can be linked and loaded by the dynamic loader are called dynamic shared objects (DSOs).

The dynamic loader is implemented as a DSO that is loaded by the operating system (OS) of a compute node during process start-up, the combination of which may be referred to as the local filesystem for the compute node. The OS gives control to the loader, which then loads the main executable's dependent libraries and transfers control to the executable's entry point. The executable may re-invoke routines in the dynamic loader to resolve symbols or to load new DSOs during runtime (via routines such as dlopen). The tasks of finding and loading object code involve many filesystem operations, and the simultaneous execution of many such operations is not scalable. Loading massively parallel applications thus has the potential to overwhelm a site-wide shared filesystem, which can disrupt other applications running across the entire computing facility.

The dynamic loader performs two types of filesystem operations: queries to locate a DSO and reads to load its contents into memory. Locating a DSO is necessary because an executable does not specify its dependent libraries with full path information, but instead provides the names of the libraries upon which execution of the executable will depend so the libraries should be loaded prior to execution. To load a particular library, the dynamic loader searches for files with its name in default system locations (e.g.,/lib), directories named in the executable (e.g., RPATHs), or directories named in environment variables such as LD_LIBRARY_PATH. In some embodiments, the filesystem comprises a GNU operating system and the GNU implementation tests for existence of files in directories by appending the name of the file to each directory and calling open on the resulting path.

Once a library has been located, the dynamic loader stores a filesystem configuration by mapping it into memory. Each library contains a table of program headers that describe what parts of the library on disk should be mapped into memory. A GNU loader uses open and read system calls to access the program headers, then memory-map (mmap) system calls to load the bulk of the library into memory.

A system that loads file a from the global filesystem and caches copies of the files in a spanning tree of compute nodes will be referred to as a filesystem service. While such a filesystem service allows many data files to be retrieved 'seamlessly' and scalably, many embodiments further address issues such as:

a. How to scalably startup this filesystem service and/or
  b. How to address a user's interest in prefetching files into the local cache before the user session begins executing.

How to scalably startup a filesystem service has a significant impact on performance since the filesystem service design starts up every time a user's session begins (for security and other architectural reasons). As a result, starting up the file system service should not be a significant burden on the global filesystem and startup of the filesystem service should be scalable.

How to address a user's interest in prefetching files is desirable from a user's perspective. For instance, the user may not want to spend cycles during their allocated user session fetching files into the cache and/or the files that a user may need in each session are likely not to vary. In such situations, it would make sense to pre-fetch files. Both situations present a problem where, to scalably load a user's binary and its shared libraries, the user needs the filesystem service, but the filesystem service itself must also scalably startup when the service is not yet available.

Embodiments may comprise methods and arrangements for pre-populating the local cache in one or more compute nodes with files for a user session in a scalable manner, enabling the rapid launch of system services as well as user applications and may be particularly advantageous on extremely large compute clusters or distributed systems. Some embodiments may address one of the above issues while other embodiments address both above issues. Note that the term "scalable" herein means that image file data is copied (cached) through a spanning tree, to distribute the load of accesses to the files to one or more compute nodes through the network and to reduce the number of accesses of the global filesystem for the same file. For instance, in several embodiments, startup of the filesystem service for a user session with multiple compute nodes may involve a single access of the global filesystem to obtain an image file.

Many embodiments include bootstrap logic circuitry to pre-populate local cache of one or more compute nodes with files for a user session. The number of compute nodes may depend on the number of compute nodes allocated to a session or job request for the user. In several embodiments, a compute node that is referred to as a root node or a master node, is a node that is designated to access the global filesystem to obtain the image file. The image file comprises files to be preloaded on the compute nodes allocated for the user's session. The bootstrap logic circuitry may transfer the image file to each of the compute nodes allocated to the user's session; unpack the image files; configure the local environment of each compute node in a spanning tree to identify a location in local memory of each of a first set of files and each of a second set of files; initiate execution of a local filesystem service in each of the compute nodes of the spanning tree; and provide each local filesystem of each of the compute nodes with a filesystem service configuration to identify the first set of files and the second set of files as a local cache of files from the global filesystem. The filesystem service configuration may inform the local filesystem service of each compute node allocated to a user session that the files are locally cached versions of files from the global filesystem as well as provide information about the locations of the files in the global filesystem.

Several embodiments pre-configure an image file for a user's session. For instance, a helper utility may determine dependencies by searching the executables to determine a list of files upon which the execution of the executable will depend; inspecting locations such as the RPATH, LD_LIBRARY_PATH, RUNPATH, and system default locations to find the directories or locations of the dependencies; appending the dependencies to the image file; and storing data, such as metadata, for the image file so the image file can be properly unpacked and interpreted by the local filesystem services of each compute node allocated or associated with the user session. Many embodiments also pre-configure a filesystem service configuration and provide the filesystem service configuration to each of the compute nodes allocated for the user session so the local filesystem service on each node can identify the files unpacked from the image file as locally cached versions of files in the global filesystem.

Various embodiments may be designed to address different technical problems associated with starting a filesystem on one or more compute nodes such as scalably starting up a filesystem service on one or more compute nodes, scalably pre-populating files that are likely not to vary between user sessions, scalably pre-populating files that a user wants available during a user session, scalably pre-populating each of the compute nodes allocated to a user's session, scalably pre-populating each compute node in a spanning tree, and/or the like.

Different technical problems such as those discussed above may be addressed by one or more different embodiments. Embodiments may address one or more of these problems associated with starting a filesystem service on one or more compute nodes. For instance, some embodiments that address problems associated with scalably starting-up a filesystem service on one or more compute nodes may do so by one or more different technical means, such as, accessing, by the bootstrap logic circuitry of a first compute node, an image file of a global filesystem, the image file to comprise a first set of one or more files associated with a user session, a second set of one or more files upon which execution of the first set will depend, and data, such as metadata, to describe the image file; storing, by the bootstrap logic circuitry, the image file in local data storage of each compute node of a spanning tree of compute nodes, the spanning tree of compute nodes to comprise one or more compute nodes allocated for the user session; unpacking, by the bootstrap logic circuitry, the image file based on the metadata in each compute node of the spanning tree; configuring, by the bootstrap logic circuitry, the local environment of each compute node in the spanning tree to identify a location in local memory of each of the first set of files and each of the second set of files; and initiating, by the bootstrap logic circuitry, execution of a local filesystem service in each of the compute nodes of the spanning tree.

Further embodiments may address one or more of the problems by instructing, by the bootstrap logic circuitry, the local filesystem service in each compute node in the spanning tree, to install a filesystem service configuration to pre-populate a representation of local cache comprising the first set of files and the second set of files; automatically pre-configuring the image file; initiating, by the bootstrap logic circuitry, a bootstrap logic circuitry by executing a bootstrap executable; and configuring the LD_LIBRARY_PATH and PATH environment variables, and the like.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), and the like. In various embodiments, these devices relate to specific applications such as healthcare, home, commercial office and retail, security, and industrial automation and monitoring applications, and the like.

FIG. 1A illustrates an example of a distributed system 100 that may be representative of various embodiments. In the distributed system 100, a communication network 101 comprises a plurality of computing devices 102-1 to 102-4 and a global filesystem 104. In some embodiments, a connectivity fabric 103 of communication network 101 may enable communication among the computing devices 102-1 to 102-4 and the global filesystem 104. In various embodiments, in the context of the application layer, the connectivity fabric 103 may enable the use of application-layer send operations to send messages for receipt via application-layer receive operations. In the example of FIG. 1A, the computing device 102-1 may be a root compute node or a master compute node for the purpose of accessing the global filesystem 104 for a user session and the computing devices 102-1 through 102-4 may comprise compute nodes allocated by a resource manager of the distributed system 100 for the user session. The computing device 102-1 may use a send operation to send a message 107 to the global filesystem 104 via connectivity fabric 103. The global filesystem 104 may use a receive operation to receive the message 107 from computing device 102-1 via connectivity fabric 103. Note that in other embodiments, the computing device 102-1 may connect directly to the global filesystem 104 via the connectivity fabric 103.

An application layer software executing on the global filesystem 104 such as a Portals application programing interface (API), may communicate via a network interface such as a network interface card (NIC). With one or more communications, the application layer software may communicate matching criteria, or data, to identify each of one or more incoming packets that encompass the message 107. In some embodiments, a pre-configuration executable that is a helper utility executing on the computing node 102-1 generates the message 107 and the message 107 comprises a request to transmit an image file to the global filesystem 104 for storage. Upon receipt of the message 107, the global filesystem 104 may respond by approving the request. The computing node 102-1 may generate one or more messages to transmit the image file and the global filesystem 104 may receive the image file to store in a local storage or storage that is accessible by the global filesystem.

The image file may comprise a first set of files and a second set of files. The first set of files may include one or more executables (such as binaries) and the second set of files may include each file upon which execution of the one or more executables will depend. Executables are files that the filesystem service may execute for the user session. For example, the first set of files may include one or more executables to execute for various operations as well as additional executables that the one or more executables may call during execution. The second set of files may include other dynamic shared object (DSO) files such as library files, configuration files, setting or preference files, common files, and/or any other type of file that the first set of files access during execution.

In some embodiments, the pre-configuration executable, when executed on processing circuitry, may comprise pre-configuration logic circuitry and the pre-configuration logic circuitry may create the image file. For example, the pre-configuration logic circuitry may determine the needed dependencies in the same way a loader program does such as a Linux loader like GNU loader. In such embodiments, the pre-configuration logic circuitry inspects local environment locations such as the RPATH, LD_LIBRARY_PATH, RUNPATH, and system default locations. Upon finding dependencies, the pre-configuration logic circuitry may append these files to the image file, and store metadata for the image file so the files can be properly unpacked and interpreted by a filesystem service for a user session. In several embodiments, the pre-configuration logic circuitry also creates a filesystem service configuration file, appends the filesystem service configuration file to the image file, and updates the metadata to include information about the filesystem service configuration file.

In further embodiments, the pre-configuration logic circuitry also optionally appends a third set of one or more files from a user or a user job request that the user wants to have preloaded for the user session. In some embodiments, the user includes a list of dependencies for the third set of one or more files. In some embodiments, the pre-configuration logic circuitry determines the dependencies and appends each of the dependencies for the third set of one or more files. For example, if the user provides a list of binaries and dependencies associated with the binaries, the pre-configuration logic circuitry may verify that the list of dependencies includes all the dependencies upon which the one or more binaries on the list may access or call during execution.

In other embodiments, a bootstrapping executable that is executing on the computing device 102-1, to configure bootstrap logic circuitry, may transmit the message 107 comprising a request to retrieve an image file associated with a user session that is stored in the global filesystem 104. The global filesystem 104 may, in response to the message 107, retrieve the image file from a local storage of the global filesystem 104 and transmit a message to the computing device 102-1 including the image file from the local storage of the global filesystem 104.

The computing device 102-4 may receive the image file from the global filesystem and store the image file in a local storage of the computing device 102-1. For instance, the computing device 102-1 may comprise a volatile data storage medium such as random-access memory (RAM) and may organize a RAM disk with a portion of or all the RAM. In other embodiments, the computing node 102-1 may comprise a non-volatile storage medium such as a hard drive, a solid state drive, an optical drive, another storage medium, and/or the like.

After storing the image file locally, the bootstrap logic circuitry of the computing device 102-1 may unpack the image file to pre-populate the local storage or cache of the computing device 102-1. Thereafter, or concurrently, the bootstrap logic circuitry may determine a spanning tree of all nodes allocated to the user session associated with the image file. In some embodiments, a resource manager establishes a spanning tree based on the nodes allocated to the user session. In other embodiments, the resource manager determines the nodes allocated to the user session and the bootstrap logic circuitry determines an appropriate spanning tree for the nodes. In further embodiments, an identifier associated with each of the nodes allocated for the user session may determine an order of the nodes for determining the spanning tree, effectively defining the spanning tree based on predefined rules for creating a spanning tree. In several embodiments, the bootstrap logic circuitry may assign each of the nodes allocated for the user session a unique identification. In some embodiments, the unique identification may establish an order of the nodes, computing devices 102-1 through 102-4. Based on the identifications and/or the order of the identifications, the bootstrap logic circuitry may determine the spanning tree such as the spanning tree 1100 illustrated in FIG. 1B. Note that each node in the spanning tree may be one of the computing devices 102-2 through 102-4 of the communication network 101.

After determining the spanning tree, the bootstrap logic circuitry may transfer the image file to each of the nodes allocated for the user session. For instance, if the allocated nodes include computing devices 102-1 through 102-4, the bootstrap logic circuitry may transfer the image file to each of these nodes, in a scalable manner, and unpack the files into a local storage of each of the nodes to establish a directory of the files, which, in some embodiments, is based on the locations of the files in the global filesystem. To transfer the image file to each of the nodes in a scalable manner, a local bootstrapping executable may execute on each of the nodes to transfer the image file from each parent node to each child node of that parent node in accordance with the spanning tree and so on until the image file is locally stored on each of the nodes allocated for the user session. The local bootstrapping executable may also execute on each of the nodes to unpack the files in the image file into locations in local memory in accordance with data included in the image file. In other embodiments, the bootstrapping executable of the computing device 102-1 may instruct local filesystems of each of the nodes to unpack the files from the image file.

After the files in the image file are unpacked, the bootstrap logic circuitry on each node may configure a local environment such as an LD_LIBRARY_PATH via, e.g., an environment variable or an LD preload cache, to provide a local filesystem service the capability to locate the files from the image file in the local storage of the node. Thereafter, the bootstrap logic circuitry of the computing device 102-1 or the bootstrap logic circuitry on each of the allocated nodes, in accordance with an instruction from the bootstrap logic circuitry of the computing device 102-1, may execute a local filesystem service executable.

For initialization of the local filesystem service on each of the nodes, the bootstrap logic circuitry of the computing device 102-1 may also store a filesystem service configuration at a known location in the local storage of each of the allocated nodes, transmit a message with an instruction to perform a filesystem service configuration that the bootstrap logic circuitry of computing device 102-1 stores locally in each of the nodes, transmit the filesystem service configuration in a message to each of the nodes, or the like. The filesystem service executable on each of the nodes may initialize service with the filesystem service configuration so that the filesystem service is aware of information about the files locally stored from the image file such as information about the location of the original files in the global filesystem 104. As a result, when a call for a file in the global filesystem is made, the local filesystem service of each node can identify the locally stored version of the file as a cached version of the file in the global filesystem.

Figure 1B:
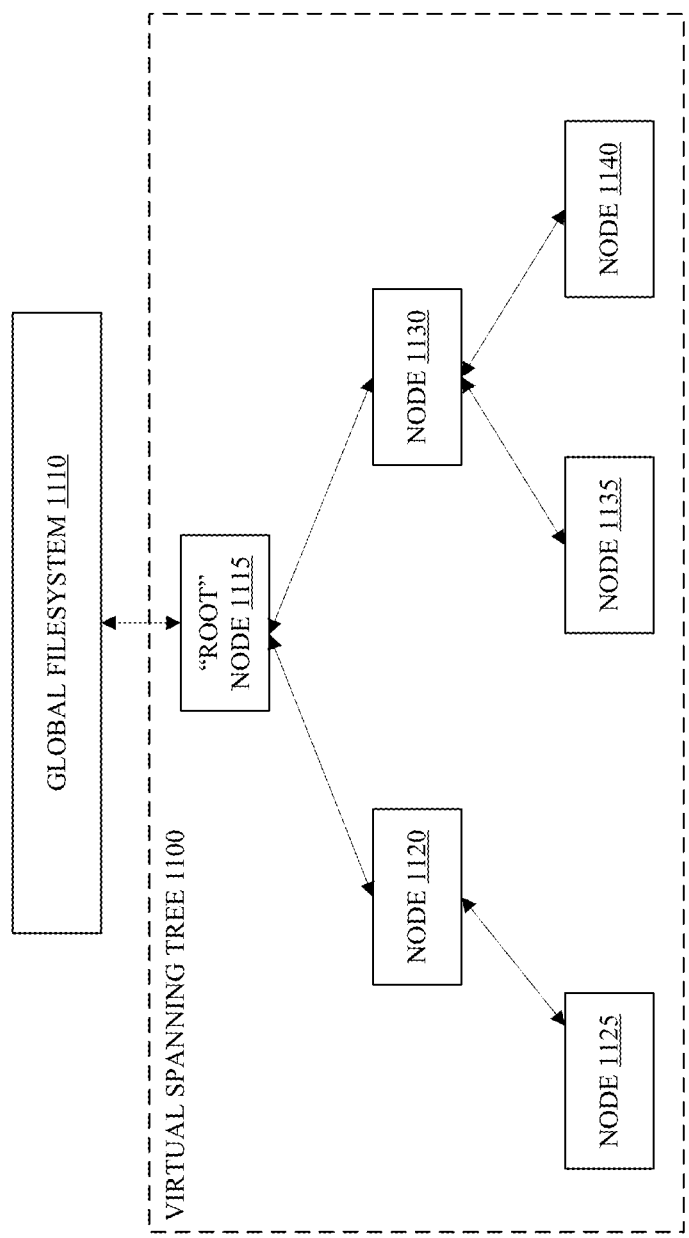
FIG. 1B depicts an embodiment of a virtual spanning tree with a branch factor of two that is created for retrieval of a file in a distributed system via a communications network, such as the distributed system illustrated in FIG. 1A.

FIG. 1B depicts an embodiment of a virtual spanning tree 1100, coupled with a global filesystem 1110, that has a branch factor of two and is created for retrieval of a file in a distributed system via a communications network, such as the distributed system 100 and the communication network 101 illustrated in FIG. 1A. The virtual spanning tree 1100 is a loop-free logical topology for the nodes 1115 through 1140, such as the computing devices 102-1 through 102-4 illustrated in FIG. 1A, that are allocated for a user session in the distributed system 100. The virtual spanning tree 1100 includes one root node or master node, herein illustrated as node 1115, that is designated for this user session to perform one or more accesses of the global filesystem 1110. In many embodiments, of the nodes in this spanning tree 1100, only node 1115 accesses the global filesystem 1110 to start-up the filesystem service during this user session. Note that any compute node allocated for a user session may be designated as the master node or root node. The spanning tree 1100 depicts a logical organization of the nodes 1115 through 1140 and the interconnections may physically be any set of interconnections between the nodes 1115 through 1140 and the global filesystem 1110 such as the connectivity fabric 103 shown in FIG. 1A.

The arrows illustrate the logical interconnections between the nodes 1115 through 1140 for the virtual spanning tree 1100. The root node or master node, node 1115, has an arrow to interconnect the node 1115 with the global filesystem 1110 to indicate that, for this user session, the node 1115 is the node designated, for the nodes in the spanning tree 1100, to communicate with the global filesystem 1110 to store or retrieve the image file during the user session. Note that the user session occurs during a time frame between the time that the user logs in to start the session and logs out to end the session. The user session is a time frame during which the user job request for a filesystem service will execute on a number of nodes allocated to the user for the user session. For example, a resource manager for the distributed system may allocate a thousand nodes to execute the filesystem service during the user session. Note that the "filesystem service" is a coordinated service that local filesystems on each of the nodes 1115 through 1140 provide and that may be defined and scheduled in response to a job request from a user of the distributed system.

In some embodiments, selection of the nodes, such as the computing devices 102-1 through 102-4 shown in FIG. 1A, to populate the spanning tree is based on the nodes that are available during the user session. For instance, the resource manager of the distributed system may select a thousand nodes from 50 thousand nodes in a distributed system, by selecting the nodes from a sub-set of the nodes in the distributed system that are not scheduled for use during the user session. The distributed system may be capable of supporting multiple, different user sessions concurrently, and each user session may involve establishment of a spanning tree. In further embodiments, the resource manager can logically divide each node of the distributed system into two or more portions of its resources and each portion can be assigned for use during different, concurrent users sessions. For example, portions of a node's resources may represent one or more portions of a physical resource, one or more time divisions for use of a physical resource, and/or a combination of both physical portions and time-divided portions of the physical resources of the node.

In some embodiments, the resource manager schedules the user session based on a job request from the user. Before the user logs in for a user session, the resource manager may initiate pre-population of the cache of the nodes in the spanning tree 1100. In other embodiments, the user login at the start of the user session initiates establishment of the spanning tree 1100 and pre-population of the cache of the nodes 1115 through 1140 in the spanning tree 1100 with the files in the image file.

In the spanning tree 1100 structure, each node has a single parent node except for the root node. The highest point on a tree structure is called a root node 1115, which does not have a parent node, but serves as the parent or 'grandparent' of all the nodes below it (nodes 1120 through 1140) in the spanning tree 1100. The height of a node is the total number of edges on the path from that node to the furthest leaf node, and the height of the tree is equal to the height of the root node 1115, which is two for the spanning tree 1100. A leaf node is a node with no children such as the nodes 1125, 1135, and 1140.

Node depth is the distance between a particular node and the root node 1115. The root node 1115 has a depth of zero. A child node is a node extending from another node. The inverse relationship is that of a parent node. If node C is a child of node A, then node A is the parent of node C.

In the spanning tree 1100, the node 1115 couples with the nodes 1120 and 1130, which are considered child nodes (or children) of the node 1115. Conversely, the node 1115 is the parent of the nodes 1120 and 1130. The node 1125 is a child of node 1120 and node 1120 is the parent of node 1125. Also, the node 1130 is the parent of nodes 1135 and 1140 and the nodes 1135 and 1140 are sibling nodes that are the children of node 1130. Note that while this embodiment illustrates the spanning tree with a branch factor of two such that each parent connects with two or less child nodes, embodiments are not limited a branching factor of two. Other embodiments may use different branching factors. For instance, embodiments are not limited to one or two child nodes or six total nodes. Different embodiments may have tens, hundreds, thousands, or more nodes and the nodes may have tens, hundreds, thousands, or more child nodes.

In the present embodiment, the node 1115 may comprise bootstrap logic circuitry to transfer an image file from the global filesystem 1110 to the node 1115. In some embodiments, the bootstrap logic circuitry may comprise a bootstrapping executable that is executing on one or more processors of the node 1115. In other embodiments, the bootstrap logic circuitry may comprise firmware executing on processing circuitry, an application-specific integrated circuit, and/or a state machine. In further embodiments, the bootstrap logic circuitry may include processing circuitry, an application-specific integrated circuit, and/or a state machine configured to perform the functionality described herein.

The bootstrap logic circuitry may also transfer the image file to each of the nodes 1120 through 1140 to pre-populate a cache of each of the nodes advantageously via a single access of the global filesystem 1110 by the node 1115. In several embodiments, the bootstrap logic circuitry of the node 1115 determines the virtual spanning tree 1100 based on the nodes allocated to the user session.

The "cache" of the nodes may refer to a cache-like organization of the files from the image file in local storage of each of the nodes 1115 through 1140. The filesystem service may access copies of files in the local storage of one of the nodes rather than accessing the global filesystem 1110 to use or access a file required for execution of a filesystem service during the user session.

Pre-populating the local cache of each node in the spanning tree 1100 with one access to the global filesystem through node 1115 advantageously allows the process to be scalable. Thus, if any node of the spanning tree requires another file or needs to replace a file with a new version of that file, such node can request the file from the parent of such node. For instance, if a file stored locally on node 1125 becomes corrupt or node 1125 otherwise requires a new version of the file, the node 1125 may request the file from the global filesystem 1110. The node 1125 routes all requests during the user session through the virtual spanning tree 1100 and the filesystem service executing on the parent node 1120 may intercept the request. Thereafter, the filesystem service executing on the parent node 1120 may respond to the request with the file from the local cache of the node 1120.

Figure 1C:
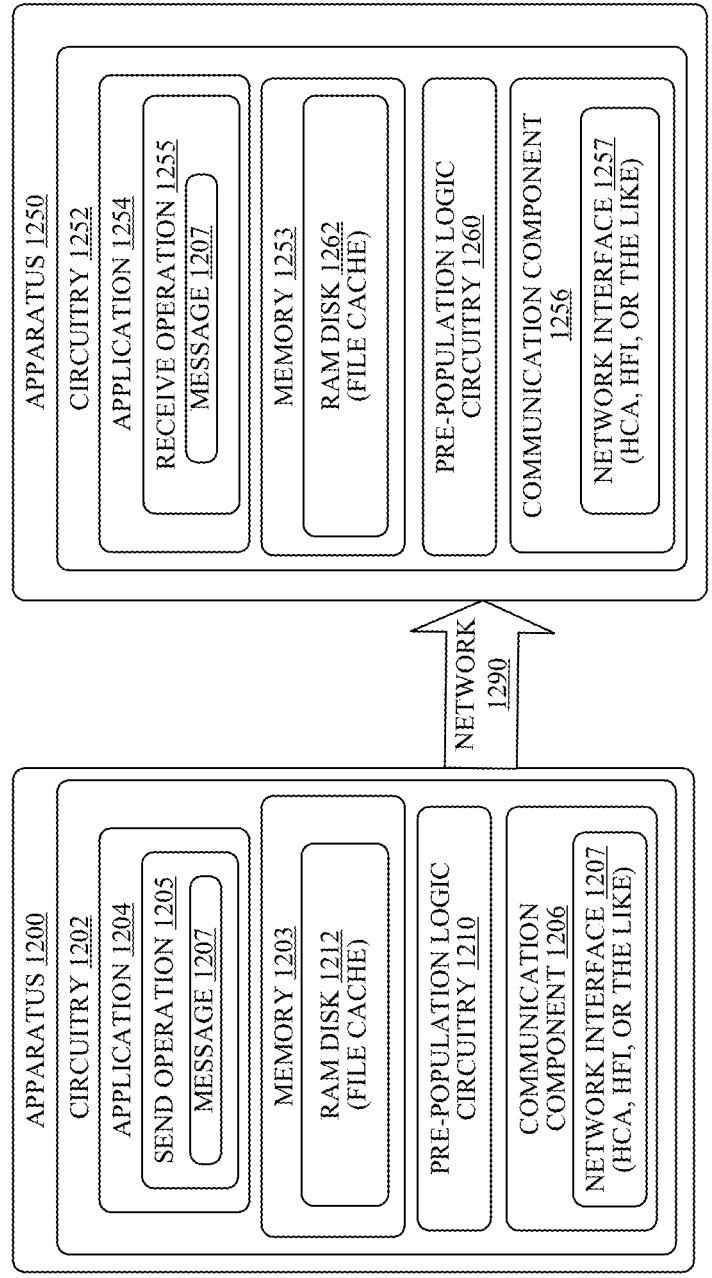
FIG. 1C depicts an embodiment of compute nodes for scalable cache pre-population in a distributed system, such as the distributed system shown in FIG. 1A.

FIG. 1C an embodiment of compute nodes, apparatuses 1200 and 1250, for scalable cache pre-population in a distributed system, such as the distributed system shown in FIG. 1A. The apparatus 1200 may be an initiator device that sends an application-layer message 1207 and the apparatus 1250 may be a target device that receives that application-layer message 1207. As shown in FIG. 1C, both apparatuses 1200 and 1250 comprise multiple elements, including respective circuitry 1202 and 1252, respective memories 1203 and 1253, and respective communications components 1206 and 1256. The embodiments, however, are not limited to the type, number, or arrangement of elements shown in this figure.

The circuitry 1202 and the circuitry 1252 may execute one or more software or firmware implemented modules or components, which may include respective applications 1204 and 1254 that implement a network programming interface. In some embodiments, the circuitry 1202 may execute the communication component 1206 as a component of the application 1204 to manage communications between apparatus 1200 and one or more remote devices in accordance with the network programing interface. In various embodiments, the circuitry 1252 may execute the communication component 1256 as a component of the application 1254 to manage communications between apparatus 1250 and one or more remote devices. In some embodiments, communication components 1206 and 1256 may be operative to send and/or receive messages such as the message 1207 via a communication network 1290 like communication network 101 of FIG. 1A. In various embodiments, communications components 1206 and 1256 may additionally comprise logic, circuitry, and/or instructions operative to perform various operations in support of such communications. Examples of such operations may include—without limitation—selection of transmission and/or reception parameters and/or timing, packet and/or protocol data unit (PDU) construction and/or deconstruction, encoding and/or decoding, error detection, and/or error correction.

In the present embodiment, the circuitry 1202 and 1252 may include pre-population logic circuitry 1210 and 1260. The pre-population logic circuitry 1210 and 1260 may comprise an executable to execute in processor circuitry of the circuitry 1202 and 1252, respectively, or may comprise circuitry configured to perform specific operations related to pre-populating a cache in the apparatuses 1200 and 1250, respectively.

In several embodiments, the pre-population logic circuitry 1210 and 1260 may automatically pre-configure an image file to store in the global filesystem during a pre-configuration phase and retrieve the image file from the global filesystem to pre-populate the file cache in the random-access memory (RAM) disks 1212 and 1262, respectively, during a bootstrapping phase. The image file may comprise files required and/or requested for a user session including file dependencies such as executables, libraries, settings, data files, and other files.

If both the apparatuses 1200 and 1250 are compute nodes allocated for the same user session, one of the apparatuses is designated as the root node (apparatus 1200 for this example) and the other apparatus may be a child node of the root node (apparatus 1250 for this example) for the purposes of storing an image file in a global file system or retrieving an image file from a global file system. In such embodiments, the root node (apparatus 1200) may perform the pre-configuration phase and store the image file in the global filesystem. During the bootstrapping phase, the root node (apparatus 1200) may access the global filesystem to obtain the image file, store the image file in local storage such as the RAM disk 1212 in the memory 1203, and distribute the image file to one or more child nodes. The child node(s) (apparatus 1250) may include pre-population logic circuitry 1260 to store the image file in the RAM disk 1262 of the memory 1253 and to distribute the image file to one or more child nodes of apparatus 1250 and so on until each of the nodes allocated for the user session has the image file in local storage.

After the image file is distributed to each of the nodes allocated for the user session, the pre-population logic circuitry 1210 of the root node (apparatus 1200) may unpack the files from the image file into the local RAM disk 1221 based on data such as metadata included in the image file and instruct the filesystem in each of the nodes allocated for the user session to unpack the image file into their local RAM disks based on data included in the image file. In other embodiments, each parent node may include pre-population logic circuitry to instruct their respective child nodes to unpack files from the image file and to store the files in their local RAM disks based on data included in the image file. In still other embodiments, each node may include pre-population logic circuitry to unpack files from the image file in response to receipt of the image file and to store the files in their local RAM disks based on data included in the image file.

Once the image file is unpacked, before the image file is unpacked, or while the image file is being unpacked in one or more of the nodes allocated to the user session, the pre-population logic circuitry 1210 of the root node (apparatus 1200) may instruct the local filesystem for each of the nodes allocated to the user session to configure a local environment (via, e.g., environment variables, an LD pre-load cache, or the like) of each compute node in the spanning tree to identify a location in local memory of each of files unpacked from the image file. For instance, the pre-population logic 1210 may instruct the local filesystem of each of the nodes allocated for the user session to configure local environment variables such as LD_LIBRARY_PATH. Thereafter, the pre-population logic circuitry 1210 may instruct the local filesystem service in each node allocated for the user session to install a filesystem service configuration to identify the files, unpacked from the image file into a local RAM disk, as a local cache of files from the global filesystem. Identifying the files as local cache of files from the global filesystem may involve, e.g., identifying the location of the files in the global filesystem.

In the present embodiment, the communication components 1206 and 1256 comprise network interfaces 1207 and 1257, respectively. The network interfaces 1207 and 1257 may be NICs such as a host channel adapter (HCA), a host fabric interface (HFI), or the like and the network 1290 may comprise a switched fabric. In other embodiments, the network 1290 may comprise a shared medium and the network interfaces may comprise a different type of NIC such as an Ethernet card. In some embodiments, the network interfaces 1207 and 1257 may include more than one type of NIC such as a NIC for switched fabric and a NIC for a shared medium, the network 1290 may include more than one type of communications medium, and network interfaces 1207 and 1257 may coordinate communications over the multiple types of media of the network 1290.

The communication component 1206 may receive a message 1207, such as the message 107 in FIG. 1A, from the application 1204 and deconstruct the message 1207 into one or more data payloads or data segments such as multiple portions of the image file. The communication component 1206 may provide the one or more data payloads to the network interface 1207 for transmission. Thereafter, the network interface 1207 may form or create the packets 1214 with the data payloads and transmit the packets 1214 to the apparatus 1250 via the network 1290. In other embodiments, the communication component 1206 may aggregate more than one messages such as message 1207 as a data payload for transmission via the network 1290.

The network interface 1257 of the apparatus 1250 may receive the one or more incoming packets 1214, each encompassing portions of the message 1207 as data payloads. After physical layer and data link layer processing, the network interface 1257 may store the incoming packets 1214 in receive buffers 1266. Considering that the receive buffers 1266 may not receive the incoming packets 1214 in a correct order for reconstruction of the message 1207, the receive buffers 1266 may store the incoming packets 1214 while the network interface 1257 reconstructs the message 1207 in the memory 1253 to reconstruct the image file from the multiple data payloads.

As part of the receive operation 1255 and prior to receipt of the incoming packets 1214, the application 1254 may communicate with the communication component 1256 to identify the incoming message 1207 from the apparatus 1200 including one or more memory locations for storage of the message 1207.

In various embodiments, either or both of circuitry 1202 and circuitry 1252 may comprise circuitry of a processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). In some embodiments, either or both of circuitry 1202 and circuitry 1252 may comprise circuitry of a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In various embodiments, either or both of circuitry 1202 and circuitry 1252 may be implemented using any of various commercially available processors, including— without limitation—AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. The embodiments are not limited in this context.

In various embodiments, apparatuses 1200 and 1250 may comprise or communicatively couple with respective memories 1203 and 1253. Either or both of memories 1203 and 1253 may comprise any machine-readable or computer-readable media capable of storing data, including both volatile and non-volatile memory. For example, either or both of memories 1203 and 1253 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion of or the entire memories 1203 and 1253 may reside on the same respective integrated circuits as circuitry 1202 and circuitry 1252, or alternatively some portion of or the entire memories 1203 and 1253 may reside on integrated circuits or other media, for example hard disk drives, that are external to the respective integrated circuits of circuitry 1202 and circuitry 1252. Although memories 1203 and 1253 are comprised within respective apparatuses 1200 and 1250 in FIG. 1C, memories 1203 and 1253 may be external to respective apparatuses 1200 and 1250 in some embodiments.

Figure 1D:
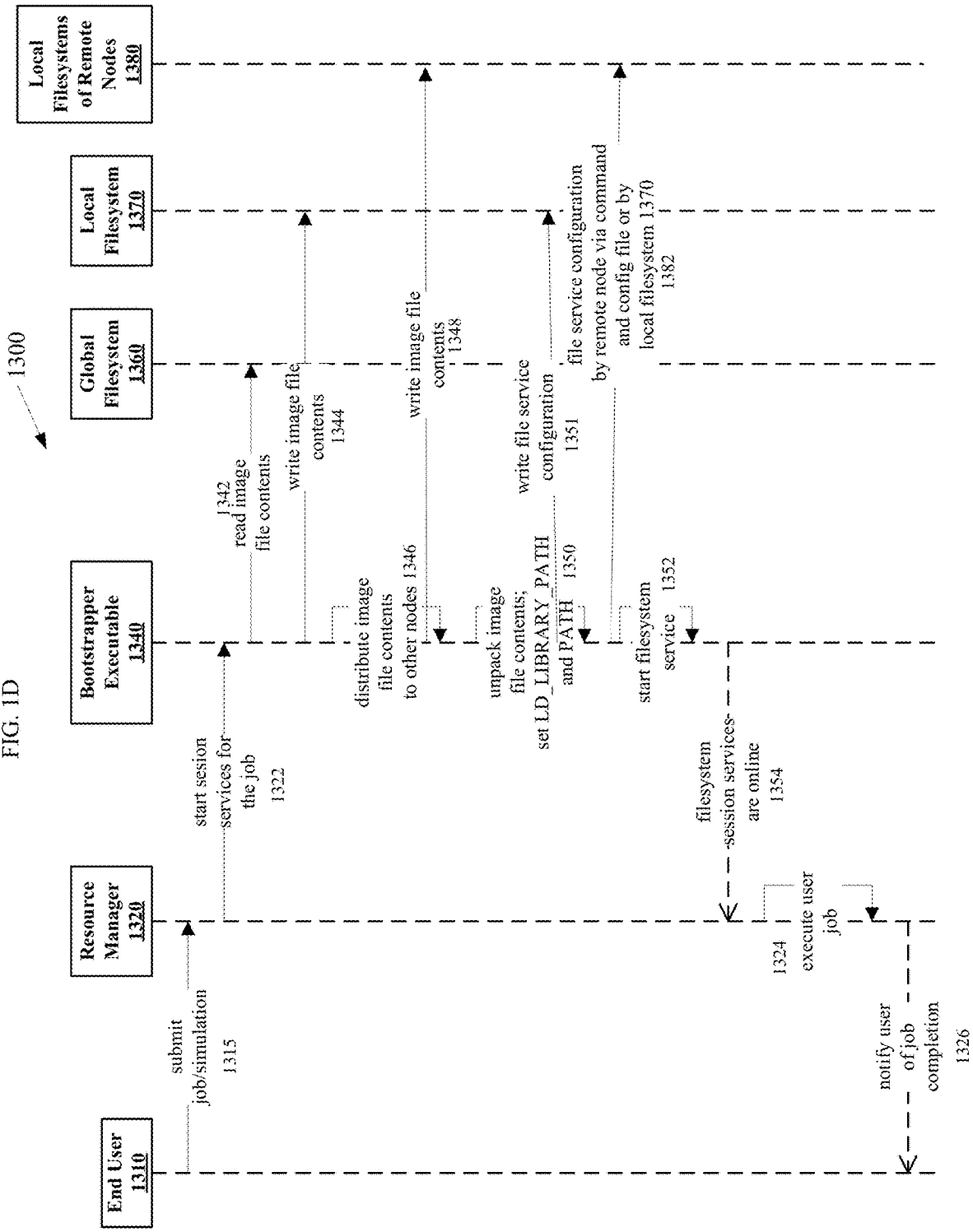
FIG. 1D depicts an embodiment of a bootstrap process, such a computing node illustrated in FIG. 1A.

FIG. 1D depicts an embodiment 1300 of a bootstrap process during a bootstrapping phase, such as the bootstrapping phase discussed in conjunction with FIG. 1C. This embodiment 1300 assumes that the pre-configuration phase or equivalent has occurred prior to the start of the bootstrapping phase such that there is an image file available in the global filesystem 1360 that includes the files required by compute nodes to perform a user session for the end user 1310. The end user 1310 is the user. The end user 1310 may submit a job or simulation 1315 to the resource manager 1320.

The resource manager 1320 may receive job requests, schedule a user session for the job, and allocate resources such as a particular number of nodes to allocate for the user session. In some embodiments, the resource manager 1320 is an application such as a daemon that executes as part of the filesystem on multiple or all nodes of a distributed system such as the distributed system 100 illustrated in FIG. 1A. In other embodiments, the resource manager 1320 may comprise an application executing on a particular server or two or more particular servers within the distributed system. For instance, the resource manager 1320 may comprise an application executing on a node that the end user 1310 operates to submit the job 1315 or a node that the end user 1310 communicates with via a terminal to submit the job or simulation 1315.

In some embodiments, the resource manager 1320 may establish a spanning tree for the nodes allocated to the user session. In other embodiments, the bootstrap logic circuitry of the root node may establish the spanning tree for the nodes allocated for the user session. In some embodiments, the bootstrap logic circuitry of the root node may call the resource manager 1320 to establish a spanning tree for the nodes allocated for the user session.

At the time of the user session or before the user session starts, the resource manager 1320 may start session services for the job 1322 by executing a bootstrapper executable 1340. The bootstrapper executable 1340 may execute on each node allocated for the user session to form bootstrap logic circuitry on each node. Execution of the bootstrapper executable 1340 may initiate the bootstrapping phase, which may begin with a root node reading the content of an image file 1342 associated with the user session from in the global filesystem 1360 and writing the image file contents 1344 to the local filesystem 1370 of the root node. In other words, the bootstrapper executable 1340 may transfer the image file from the global filesystem 1360 into local memory of the root node such as in a RAM disk or other local storage medium of the local filesystem 1370.

After reading the image file 1342 from the global filesystem 1360, the root node may distribute the image file to one or more other nodes 1346 that are allocated for the user session and a bootstrap executable that executes on each of the other nodes allocated to the user session may write the image file 1348 to the local filesystems of remote nodes 1380. Furthermore, the bootstrapper executable 1340 on the root node and the bootstrapper executable on each of the remote nodes may unpack the image file contents based in data such as metadata included in the image file. The bootstrapper executable on each node will store the files from the image file in predefined locations within local storage of the node and set a local environment such as LD_LIBRARY_PATH and PATH 1350.

After or concurrently with unpacking the image file, the bootstrapper executable 1340 of the root node may transmit a filesystem service configuration to nodes allocated for the user session. In some embodiments, the bootstrapper executable on each of the nodes may transmit the filesystem service configuration to each child node and so on until every node allocated to the user session receives the filesystem service configuration. Thereafter, the root node may broadcast or send a group message to every node allocated to the user session to instruct the local filesystem service to install or otherwise implement the filesystem service configuration 1382. In other embodiments, the bootstrapper executable on each node may store the filesystem service configuration at a location that the filesystem service may check at start-up as a default location for configuration files 1382.

In still other embodiments, the bootstrapper executable 1340 on the root node may write a filesystem service configuration 1351 to the local filesystem 1370 and broadcast or send a group message, to each of the nodes allocated to the user session, that includes the filesystem service configuration 1382 and the message may include an instruction to install or otherwise implement the filesystem service configuration.

After or during a transmission of the filesystem service configuration to the nodes allocated to the user session, the bootstrapper executable 1340 may transmit or broadcast a message, such as the message 107 in FIG. 1A and the message 1207 in FIG. 1C, to initiate execution of the filesystem service 1352. Once the filesystem service is online 1354, the resource manager 1320 can execute the job 1324 that the end user 1310 requested for the user session and notify the end user 1310 of job completion 1326 after the completing the job.

Figure 2:
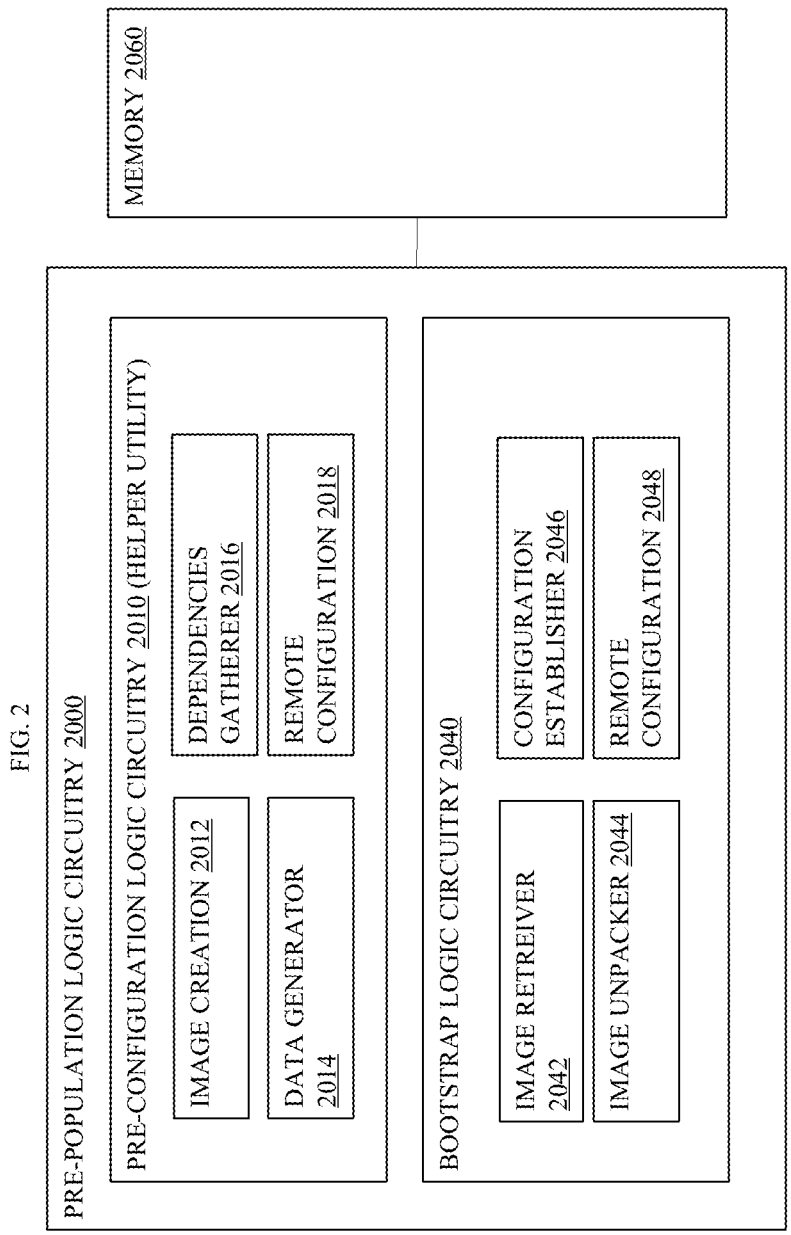
FIG. 2 depicts an embodiment of an apparatus to access shared files, such a computing node illustrated in FIG. 1A.

FIG. 2 depicts an embodiment of an apparatus to access shared files, such a computing node illustrated in FIG. 1A. The apparatus comprises pre-population logic circuitry 2000 to pre-populate cache of compute nodes with files to perform a user job with a filesystem service. Pre-population, advantageously, allows a scalable start-up of the filesystem service for a user session.

The pre-population logic circuitry 2000 may comprise a pre-configuration logic circuitry 2010, which may also be referred to as a helper utility, and bootstrap logic circuitry 2040. The pre-configuration logic circuitry 2010 may create an image file that includes multiple files such as the image files discussed in conjunction with FIGS. 1A-D. The multiple files may include a first set of files that are executables and a second set of files that are files upon which execution of one or more files in the first set depend.

The pre-configuration logic circuitry 2010 may comprise logic circuitry including image creation 2012, data generator 2014, dependencies gatherer 2016, and remote configuration 2018. The image creation 2012 may automatically create an image file for a user session in response to, e.g., installation of a filesystem service or receipt of a first job request for a reoccurring job for that uses the same set of files during each user session. In some embodiments, the image creation 2012 may determine dependencies associated with the filesystem service by identifying files called by the filesystem service executable. For instance, for a Linux operating system, the filesystem service executable may include calls to or loads of files that the filesystem service executable may use during execution such as libraries, settings, data files, other executables, and the like. The image creation 2012 may search the filesystem service executable to determine the names of the files accessed by the filesystem service executable.

In some embodiments, the image creation 2012 may automatically select an image file associated with a filesystem service and append any additional executables that a user requests in a job request or a set of files or list of files that the user provides either with the job request or otherwise. In other embodiments, the image creation 2012 may select an existing image file created by other means that includes the files required to perform a filesystem service for a user job request.

The image creation 2012 may call the data generator 2014 to generate data such as metadata to describe the content of the image file. For instance, the image creation 2012 may include several files within the image file and the data generator 2014 may generate data to include in the image file or to append to the image file that describes to how to unpack the files from the image file. In some embodiments, the image creation 2012 may compress or encode the image file and the data generator 2014 may generate data, to include in the image file or to append to the image file, that describes to how to decompress or decode the image file. In further embodiments, the image creation 2012 may include a cyclic redundancy code (CRC) for each file or for one or more of the files and the data generator 2014 may generate data, to include in the image file or to append to the image file, that describes to how to parse the files and the CRC(s) from the image file. In still further embodiments, the image creation 2012 may include directories within which to store the files from the image file and the data generator 2014 may generate data, to include in the image file or to append to the image file, that describes to how to determine the directories for the files from the image file.

The image creation 2012 may call the dependencies gatherer 2016 to find files that are dependencies of the filesystem service executable(s) and/or other executables that the user may indicate for inclusion in the image file for use during a user session. The image creation 2012 may append additional executables indicated by the user as well as files upon which execution of the additional executables will depend and may call the data generator 2014 to generate data to include in the image file to describe the additional executables and their dependencies.

In some embodiments, the pre-configuration logic circuitry 2010 also includes logic circuitry such as the remote configuration 2018. The remote configuration 2018 may generate a filesystem service configuration to include in or with the image file to configure the filesystem service of each of the nodes allocated for a user session to identify one or more files from the image file as local cache versions of files in the global filesystem.

The bootstrap logic circuitry 2040 may perform the bootstrapping phase of pre-population of the local cache of nodes with files from the global filesystem. In some embodiments, the bootstrap logic circuitry 2040 may comprise a statically linked bootstrapper executable and processing circuitry to execute the bootstrapper executable. The bootstrap logic circuitry 2040 may include logic circuitry comprising an image retriever 2042, an image unpacker 2044, a configuration establisher 2046, and a remote configuration 2048.

The image retriever 2042 may execute on the root node of a spanning tree of nodes allocated to the user session and may transfer a previously created image file associated with the user session from the global filesystem to the root node's local storage such as the memory 2060. The bootstrap logic circuitry 2040 may then transfer the image file to all node's local storage in a scalable way. For instance, the bootstrap logic circuitry 2040 of the root node may transfer the image file to the local storage of each child node of the root node. Thereafter, the bootstrap logic circuitry 2040 of the one or more child node(s) may transfer the image file to the local storage of each of their child nodes and so on until each node from the root node through each leaf node includes the image file.

The image unpacker 2044 on each of the nodes allocated to the user session may then unpack the image file in their local storage as well as the data into predefined storage locations on each node's local storage. Based on the data, the configuration establisher 2046, on each of the nodes allocated for the user session, may configure the environment variables, such as LD_LIBRARY_PATH and PATH, to point to the location of the unpacked storage location on each node.

The remote configuration 2048 may receive a filesystem service configuration with the image file, in the image file, or from the root node and store the filesystem service configuration in the local storage. In some embodiments, the remote configuration 2048 may also receive a command or instruction from the root node to install the filesystem service configuration and may, in response, install the filesystem service configuration or instruct the filesystem service to install the filesystem service configuration. In several embodiments, an instruction to the filesystem service to install the filesystem service configuration may comprise storage of the filesystem service configuration at a particular location in the local storage of each of the nodes allocated to the user session.

Once the files are unpacked from the image file, the bootstrap logic circuitry 2040 of the root node may initiate the filesystem service and may instruct each of the nodes allocated to the user session to initiate the filesystem service. In response to the instruction to initiate the filesystem service, the bootstrap logic circuitry 2040 of each of the nodes allocated to the user session may initiate the local filesystem service of the respective nodes. In many embodiments, initiation of the local filesystem service may involve execution of a locally stored filesystem service executable. A loader in the filesystem of each node may fetch the necessary files for execution and for loading. The environment variables may cause the filesystem service to access locally cached versions of the files that were unpacked from the image file. And the filesystem service configuration may cause the filesystem service to identify the locally cached versions of the files that were unpacked from the image file as cached versions of files located in the global filesystem so that the filesystem service does not attempt to load a new version of dependencies from the global filesystem.

Figure 3B:
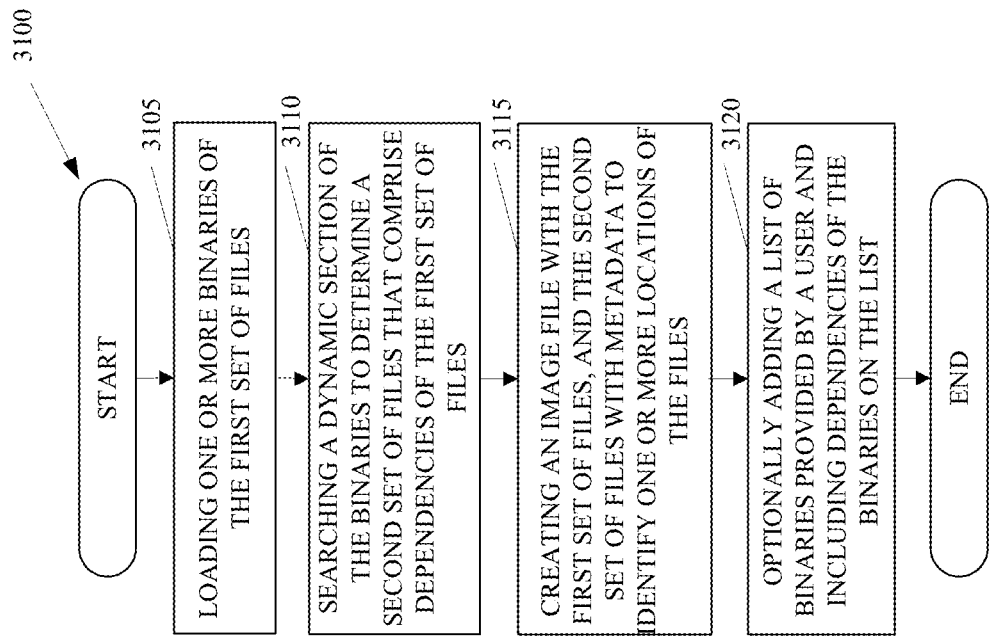
FIGS. 3A-C depict embodiments of flowcharts to access shared files by nodes such as the computing nodes illustrated in FIGS. 1-2.
Figure 3A:
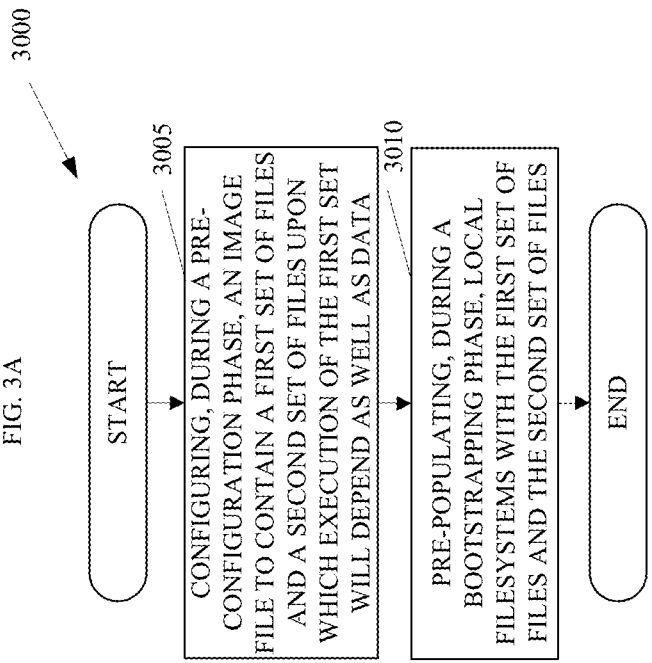
Figure 3C:
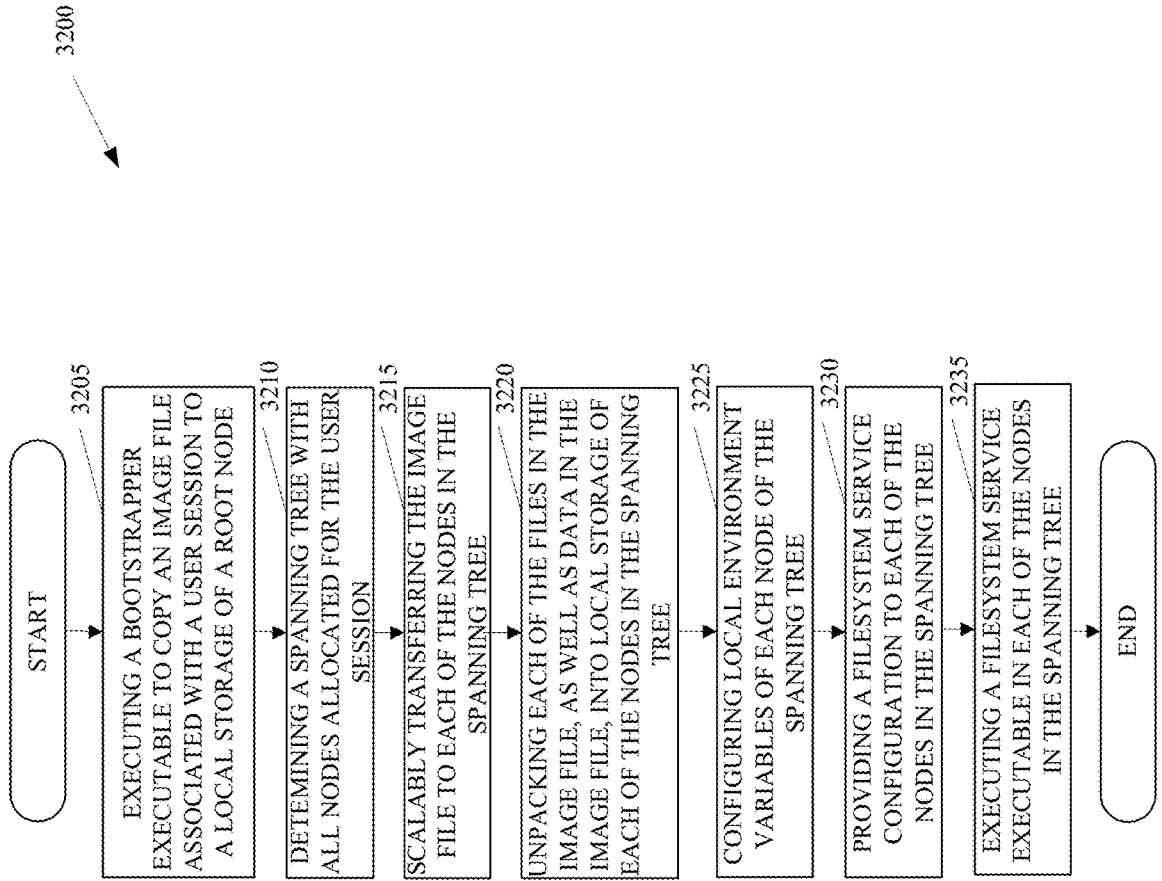

FIGS. 3A-C depict embodiments of flowcharts to access shared files by nodes such as the computing nodes illustrated in FIGS. 1-2. FIG. 3A illustrates an embodiment of a flowchart 3000 to create or configure an image file to include executable files and their dependencies to execute a filesystem service for a user session and to pre-populate the cache of each node allocated for the user session to include the executable files and their dependencies. The flowchart 3000 begins with pre-configuration logic circuitry configuring, during a pre-configuration phase, an image file to contain a first set of files and a second set of files upon which execution of the first set will depend as well as data such as metadata (element 3005). For instance, the first set of files may include one or more executable files that call or access information from the other files. The image file may include each executable file associated with the filesystem service and the files called or accessed by each executable file. Note that the data may describe the content of the image file as well as directories in which to store files. In some embodiments, the image file includes the data. In other embodiments, the data is a file associated with the image file that the bootstrap logic circuitry will obtain along with the image file when accessing the global filesystem. After the creation of the image file, the pre-configuration logic circuitry may store the image file in a global filesystem.

After the image file is stored in the global filesystem, bootstrap logic circuitry may pre-populate, during a bootstrapping phase, local filesystems, of nodes allocated for a user session, with the first set of files and the second set of files (element 3010). After pre-populating local filesystems with the files from the image file, the bootstrap logic circuitry may initiate or start-up the filesystem service associated with the user session.

FIG. 3B illustrates an embodiment of a flowchart 3100 to pre-configure an image file to pre-populate a cache with files for execution of a filesystem service for a user session. The flowchart 3100 begins with loading one or more executables of the first set of files (element 3105). In some embodiments, the filesystem service may include one or more executables and the pre-configuration logic circuitry may load the one or more executables to search the executables. The pre-configuration logic circuitry may search a dynamic section of the executables to determine a second set of files that comprise dependencies of the first set of files (element 3110). The dynamic section of the executables may include, for instance, indications of the dependencies of the executables as well as the location of the executables.

After identifying the executables and dependencies of the executables, the pre-configuration logic circuitry may create the image file with the first set of files, the second set of files, and data such as metadata to identify one or more locations of the files as well as to describe the format of the image file (element 3115). The data may describe directories for one or more of the files so that one or more nodes can unpack the image file to store the first and second sets of files in directories or locations at which the local filesystem service can locate the files during execution of the local filesystem service for the user session.

In some embodiments, the pre-configuration logic circuitry may optionally add a list of executables provided by a user and including dependencies of the executables on the list (element 3120) as files to include in the image file for the user session. For instance, during the user session, the file system service may require access to additional executables and their dependencies to perform operations for a job request by the user. The user may provide a list of additional executables and may also include a list of the dependencies for the additional executables so that the pre-configuration logic circuitry can append the additional executables and their dependencies to the image file. After creation of the image file, the pre-configuration logic circuitry may store the image file in the global filesystem.

FIG. 3C illustrates an embodiment of a flowchart 3200 to pre-populate cache of local filesystems of the nodes allocated for a user session with files required to perform a filesystem service for a user during the user session. The flowchart 3200 begins with executing a bootstrapper executable to transfer an image file associated with a user session from a global filesystem to a local storage of a root node (element 3205). For instance, a resource manager such as the resource manager illustrated in FIG. 1D may start a user session by initiating execution of the bootstrapper executable in the root node of a spanning tree of nodes allocated for the user session.

When executed via processing circuitry, the bootstrapper executable may configure the processing circuitry to perform operations described in conjunction with FIGS. 1A-1D and/or FIG. 2 for bootstrap logic circuitry. In some embodiments, the bootstrap logic circuitry may determine a spanning tree created by the resource manager of the nodes allocated for the user session (element 3210). In other embodiments, the bootstrap logic circuitry may determine the spanning tree based on nodes allocated for user session.

After determining the spanning tree, the bootstrap logic circuitry of the root node may transfer (or transmit or copy) the image file to each of the nodes in the spanning tree by a scalable method (element 3215). In many embodiments, the scalable method involves transferring the image file from each parent node to their respective child nodes to distribute the load amongst the nodes allocated to the user session and to more efficiently utilize the fabric between nodes allocated to the user session.

The bootstrap logic circuitry of each node may then unpack, or extract, each of the files in the image file, as well as data such as metadata from the image file, into local storage of each of the nodes in the spanning tree (element 3220) to populate a local file cache with files to execute the filesystem service during the user session. The bootstrap logic circuitry of each node may also configure the local environment (such as local environment variables or LD preload cache) of each node of the spanning tree based on the data from the image file (element 3225) so the local filesystem service of each node allocated for the user session can locate the locally cached files for execution of the filesystem service associated with the user session.

The bootstrap logic circuitry of the root node may also transmit a group message or broadcast a message to provide a filesystem service configuration to each node in the spanning tree or to identify a location at which the filesystem service configuration is locally stored in each node (element 3230). The filesystem service configuration may include information to identify the locally stored files from the image file as cached versions of files located in the global filesystem. Thereafter, the bootstrap logic circuitry of the root node may instruct filesystem of each node in the spanning tree to initiate the filesystem service (element 3235). In other embodiments, the bootstrap logic circuitry of each node may instruct filesystem of each node in the spanning tree to initiate the filesystem service either based on a message from the root node or based on completion of a task such as configuration of the local environment variables or receipt of the filesystem service configuration.

Figure 4A:
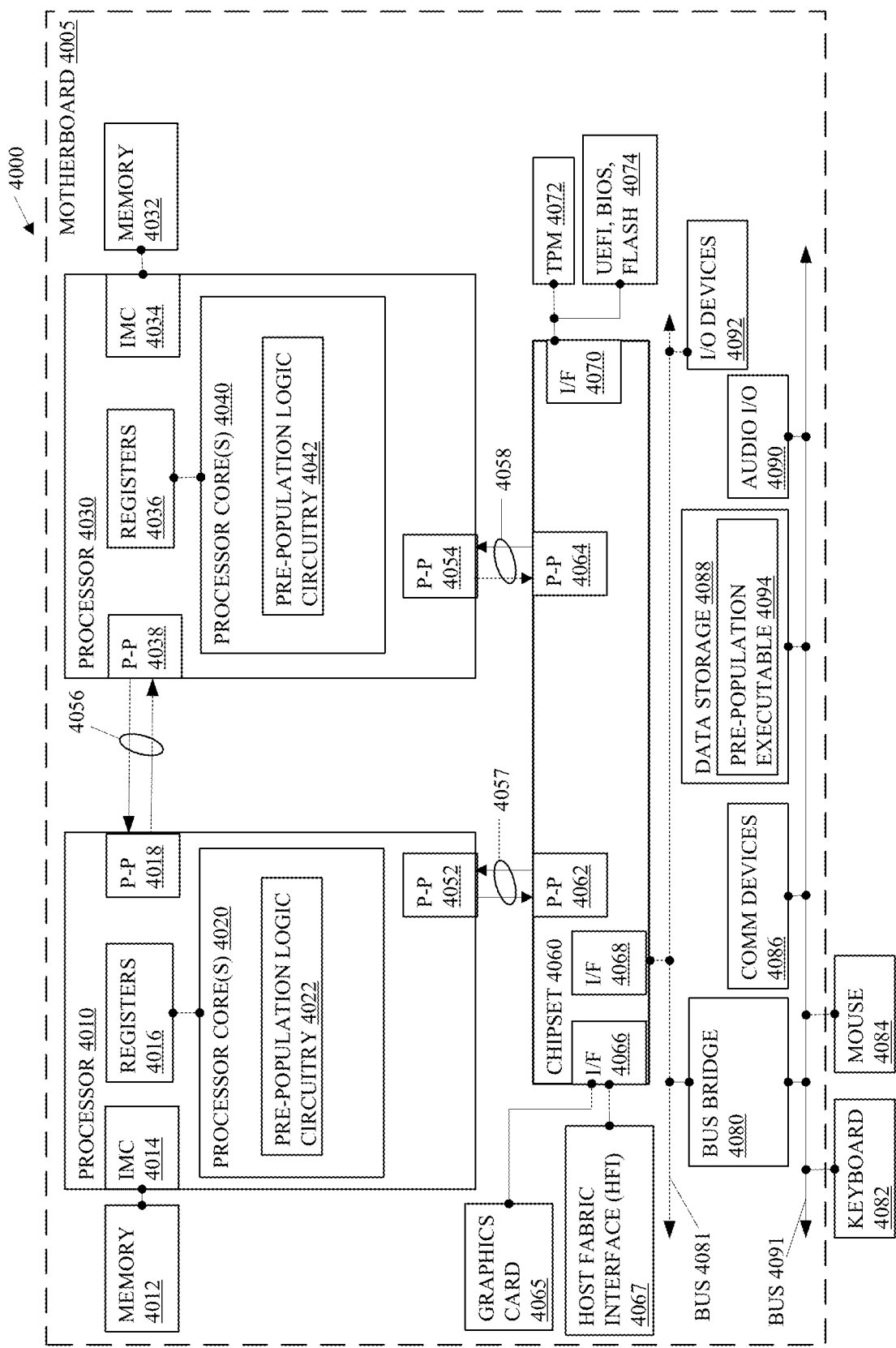
FIG. 4A depict embodiments of a compute node such as the compute nodes in FIG. 1A.

FIG. 4A illustrates an embodiment of a system 4000 such as the computing nodes 102-1 through 102-5 in FIGS. 1-2 and the apparatuses 1200 and 1250 in FIG. 1C. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4A, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

In some embodiments, the processor core(s) 4020 and 4042 may comprise pre-population logic circuitry such as the pre-population logic circuitry 1210, 1260, and 2000 described in conjunction with FIGS. 1C and 2. The pre-population logic circuitry may comprise processing circuitry configured for perform the operations described for the pre-population logic circuitry 1210, 1260, and/or 2000 described in conjunction with FIGS. 1C and/or 2.

The first processor 4010 includes an integrated memory controller (IMC) 4014 and point-to-point (P-P) interfaces 4018 and 4052. Similarly, the second processor 4030 includes an IMC 4034 and P-P interfaces 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform (such as the main memory 478 in FIG. 4) such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the UEFI, BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065 and a host fabric interface (HFI) 4067. The I/F 4066 may be, for example, a Peripheral Component Interconnect-enhanced (PCI-e). The HFI 4067 may include a network interface to couple the system 4000 with a connectivity fabric such as the connectivity fabric 103 in FIG. 1A. The HFI 4067 may be a network interface card (NIC) coupled with the system 4000 or may comprise a portion of an integrated circuit of the chipset 4060 or of a processor such as the processor 4010 and/or the processor 4030. The HFI 4067 may interface the system 4000 with other systems or storage devices such as the computing devices 102-1 through 102-5 illustrated in FIG. 1A via a connectivity fabric such as Fibre Channel or the like.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086, and a data storage unit 4088 that may store code. Furthermore, an audio I/O 4090 may couple to second bus 4091. Many of the I/O devices 4092, the communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005. In some embodiments, the data storage unit 4088 may comprise a pre-population executable that can execute of a processor core such as the processor core(s) 4022 and 4042 to configure pre-population logic circuitry 4022 and 4042.

Figure 4B:
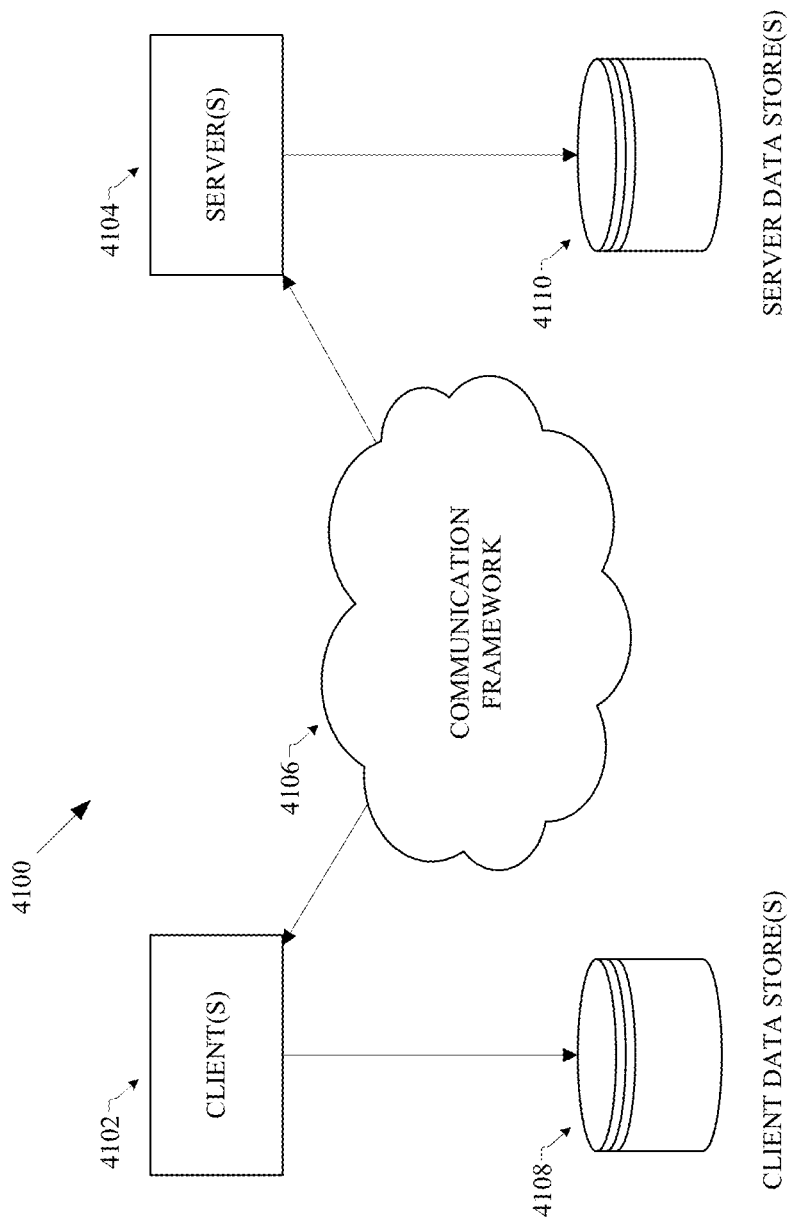
FIG. 4B depicts an embodiment of a communications architecture.

FIG. 4B illustrates a block diagram of an exemplary communications architecture 4100 suitable for implementing various embodiments as previously described. The communications architecture 4100 includes various common communications elements, such as a transmitter, receiver, transceiver, radio, network interface, baseband processor, antenna, amplifiers, filters, power supplies, and so forth.

As shown in FIG. 4B, the communications architecture 4100 comprises includes one or more clients 4102 and servers 4104. The clients 4102 and the servers 4104 operatively connect to one or more respective client data stores 4108 and server data stores 4110 to store information local to the respective clients 4102 and servers 4104, such as cookies and/or associated contextual information. Any one of clients 4102 and/or servers 4104 may implement one or more of apparatus 1200 and apparatus 1250 of FIG. 1D, apparatus 2000 of FIG. 2, apparatus 4000 of FIG. 4A, flowchart 3000 of FIG. 3A, flowchart 3100 of FIG. 3B, flowchart 3200 of FIG. 3C, storage medium 5000 of FIG. 5, and computing platform 6000 of FIG. 6. In various embodiments, either or both of apparatuses 1200 and 1250 of FIG. 1D may comprise one or more switching devices and/or routing devices in the communication framework 4106.

The clients 4102 and the servers 4104 may communicate information between each other using a communication framework 4106. The communications framework 4106 may implement any well-known communications techniques and protocols. The communications framework 4106 may be a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 4106 may implement various network interfaces arranged to accept, communicate, and connect to a communications network. A network interface may be a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may engage with various communications network types. For example, multiple network interfaces may facilitate communication over broadcast, multicast, and unicast networks. Should processing requirements dictate a greater amount speed and capacity, distributed network controller architectures may pool, load balance, and otherwise increase the communicative bandwidth required by clients 4102 and the servers 4104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 5:
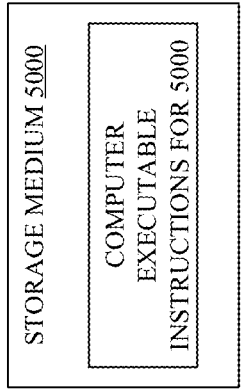
FIGS. 5-6 depicts embodiments of a storage medium and a computing platform of embodiments described herein.

FIG. 5 illustrates an example of a storage medium 5000 to store pre-population logic such as one or more pre-population executables. Storage medium 5000 may comprise an article of manufacture. In some examples, storage medium 5000 may include any non-transitory computer readable medium or machine-readable medium, such as an optical, magnetic or semiconductor storage. Storage medium 5000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 6:
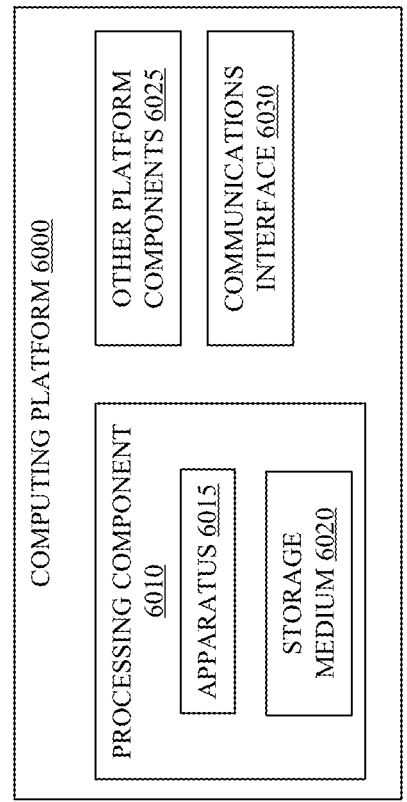

FIG. 6 illustrates an example computing platform 6000 such as the computing devices 102-1 through 102-5 in FIGS. 1-2, apparatuses 1200 and 1250 in FIG. 1D, apparatus 2000 in FIG. 2, and apparatus 4000 in FIG. 4A. In some examples, as shown in FIG. 6, computing platform 6000 may include a processing component 6010, other platform components or a communications interface 6030. According to some examples, computing platform 6000 may be a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 6000 may include or exclude functions and/or specific configurations of the computing platform 6000 described herein.

The components and features of computing platform 6000 may comprise any combination of discrete circuitry, ASICs, logic gates and/or single chip architectures. Further, the features of computing platform 6000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like.

Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, pre-populating cache of compute nodes allocated to a user's session advantageously enables filesystem/user session services (which are on the critical path in terms of time to solution in HPC) to startup as quickly as possible while using minimal storage and network resources on the cluster or distributed system. This enables efficient use of costly system resources, speeds up solution time for customers, and ensures HPC solutions meet and exceed customer's needs. Automatically creating an image file with a first set of files for a user's session or job and a second set of files with files upon which the first set of files depend for execution advantageously enables system/user session services to startup as quickly as possible while using minimal storage and network resources on the cluster. Automatically creating an image file with a first set of files for a user's session or job and a second set of files with files upon which the first set of files depend for execution and appending user designated files advantageously enables system/user session services to startup as quickly as possible while using minimal storage and network resources on the cluster. Executing a bootstrapper executable to initiate bootstrapper logic circuitry advantageously enables system/user session services to startup as quickly as possible while using minimal storage and network resources on the cluster. Executing a bootstrapper executable to transfer the image file to all compute node's local storage in a spanning tree associated with the user's session or job to ensure the distribution of this file is scalable advantageously enables system/user session services to startup as quickly as possible while using minimal storage and network resources on the cluster. Unpacking the image file and metadata into predefined storage locations on each compute node's local storage of the spanning tree advantageously enables system/user session services to startup as quickly as possible while using minimal storage and network resources on the cluster. Configuring local path environment variables such as the LD_LIBRARY_PATH and PATH environment variables to point to the location of the unpacked storage location on each node advantageously enables system/user session services to startup as quickly as possible while using minimal storage and network resources on the cluster. Initiating a filesystem service executable advantageously enables system/user session services to startup as quickly as possible while using minimal storage and network resources on the cluster. Providing a filesystem service configuration advantageously enables system/user session services to startup as quickly as possible while using minimal storage and network resources on the cluster.

EXAMPLES OF FURTHER EMBODIMENTS

The following examples pertain to further embodiments. Specifics in the examples may be used anywhere in one or more embodiments.

Example 1 is an apparatus to access shared files, the apparatus comprising: memory: and logic circuitry to: access an image file of a global filesystem, the image file comprising a first set of one or more files associated with a user session and a second set of one or more files, the execution of the first set depending on the second set of one or more files; store the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked filed comprising the first set of one more files and the second set of one more files; configure a local filesystem service environment of the more than one compute node in the spanning tree, wherein the configured local file service environment is to identify a location in local memory of each of the unpacked files; and initiate, after the image file is unpacked, execution of the local filesystem service in the more than one compute nodes of the spanning tree. In Example 2, the apparatus of Example 1, wherein the logic circuitry is configured to instruct the local filesystem service in each compute node in the spanning tree, to install a filesystem service configuration to identify the first set of files and the second set of files as a local cache of the image file from the global filesystem. In Example 3, the apparatus of Example 2, wherein the logic circuitry is configured to store the filesystem service configuration at a predetermined location, the filesystem service to automatically install the filesystem service configuration at the predetermined location. In Example 4, the apparatus of Example 2, wherein the logic circuitry is configured to provide a location of the filesystem service configuration in a command. In Example 5, the apparatus of Example 2, wherein the logic circuitry is configured to provide the filesystem service configuration within a command. In Example 6, the apparatus of Example 1, wherein the logic circuitry is configured to initiate a bootstrap logic circuitry by execution of a bootstrapper executable on the unpacked files. In Example 7, the apparatus of Example 1, wherein the logic circuitry is configured to configure the LD_Library_Path and Path environment variables. In Example 8, the apparatus of Example 1, wherein the logic circuitry is configured to execute a filesystem service executable. In Example 9, the apparatus of Example 1, wherein the local data storage comprises a random-access memory (RAM) disk. In Example 10, the apparatus of Example 1, wherein the one or more compute nodes comprise nodes of a high-performance computing (HPC) system. In Example 11, the apparatus of Example 1, wherein the logic circuitry is configured to automatically pre-configure the image file, wherein automatic pre-configuration creates the image file and corresponding data for the image file. In Example 12, the apparatus of Example 1, wherein the logic circuitry is configured to automatically determine file dependencies by inspection of RPath, LD_Library_Path, RunPath, and system default locations and to optionally append user-identified files to the image file.

Example 13 is a system to access shared files, the system comprising a memory comprising a dynamic random-access memory coupled with a processor of the bootstrap logic circuitry in accordance with any one of Examples 1-12.

Example 14 is a method to access shared files, the method comprising: accessing, by a bootstrap logic circuitry of a first compute node associated with a user session, an image file of a global filesystem, the image file comprising a first set of one or more files associated with the user session and a second set of one or more files, the execution of the first set depending on the second set of one or more files; storing, by the bootstrap logic circuitry, the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked filed comprising the first set of one more files and the second set of one more files; configuring, by the bootstrap logic circuitry, a local filesystem service environment of the more than one compute node in the spanning tree, wherein the configured local file service environment is to identify a location in local memory of each of the unpacked files; and initiating, by the bootstrap logic circuitry after the image file is unpacked, execution of the local filesystem service in the more than one compute nodes of the spanning tree. In Example 15, the method of Example 14, further comprising instructing, by the bootstrap logic circuitry, the local filesystem service in each compute node in the spanning tree, to install a filesystem service configuration to identify the first set of files and the second set of files as a local cache of the image file from the global filesystem. In Example 16, the method of Example 15, wherein instructing, by the bootstrap logic circuitry, the local filesystem service to install a filesystem service configuration comprises storing the filesystem service configuration at a predetermined location, the filesystem service to automatically install the filesystem service configuration if located at the predetermined location. In Example 17, the method of Example 15, wherein instructing, by the bootstrap logic circuitry, the local filesystem service to install a filesystem service configuration comprises providing a location of the filesystem service configuration in a command line. In Example 18, the method of Example 15, wherein instructing, by the bootstrap logic circuitry, the local filesystem service to install a filesystem service configuration comprises providing the filesystem service configuration within a command. In Example 19, the method of Example 14, further comprising initiating the bootstrap logic circuitry by execution of a bootstrapper executable on the unpacked files. In Example 20, the method of Example 14, wherein configuring, by the bootstrap logic circuitry, the local environment comprises configuring the LD_Library_Path and Path environment variables. In Example 21, the method of Example 14, wherein initiating, by the bootstrap logic circuitry, execution of the local filesystem comprises executing a filesystem service executable. In Example 22, the method of Example 14, wherein the local data storage comprises a random-access memory (RAM) disk. In Example 23, the method of Example 14, wherein the one or more compute nodes comprise nodes of a high performance computing (HPC) system. In Example 24, the method of Example 14, further comprising automatically pre-configuring the image file, wherein automatic pre-configuration creates the image file and corresponding data for the image file. In Example 25, the method of Example 14, further comprising automatically, by a pre-configuration logic circuitry, determining file dependencies by inspection of RPath, LD_Library_Path, RunPath, and system default locations and to optionally append user-identified files to the image file.

Example 26 is a system to access shared files, the system comprising: more than one compute nodes coupled, wherein one of the compute nodes comprises a functional block to: access an image file of a global filesystem, the image file comprising a first set of one or more files associated with a user session and a second set of one or more files, the execution of the first set depending on the second set of one or more files; store the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked filed comprising the first set of one more files and the second set of one more files; configure a local filesystem service environment of the more than one compute node in the spanning tree, wherein the configured local file service environment is to identify a location in local memory of each of the unpacked files; and initiate, after the image file is unpacked, execution of the local filesystem service in the more than one compute nodes of the spanning tree. In Example 27, the system of Example 26, wherein the functional block is configured to instruct the local filesystem service in each compute node in the spanning tree, to install a filesystem service configuration to identify the first set of files and the second set of files as local cache of the image file from the global filesystem. In Example 28, the system of Example 27, wherein the functional block is configured to store the filesystem service configuration at a predetermined location, the filesystem service to automatically install the filesystem service configuration at the predetermined location. In Example 29, the system of Example 27, wherein the functional block is configured to provide a location of the filesystem service configuration in a command. In Example 30, the system of Example 27, wherein the functional block is configured to provide the filesystem service configuration within a command. In Example 31, the system of Example 26, wherein the functional block is configured to initiate a bootstrap logic circuitry by execution of a bootstrapper executable on the unpacked files. In Example 32, the system of Example 26, wherein the functional block is configured to configure the LD_Library_Path and Path environment variables. In Example 33, the system of Example 26, wherein the functional block is configured to execute a filesystem service executable. In Example 34, the system of Example 26, wherein the local data storage comprises a random-access memory (RAM) disk. In Example 35, the system of Example 26, wherein the one or more compute nodes comprise nodes of a high-performance computing (HPC) system. In Example 36, the system of Example 26, wherein the functional block is configured to automatically pre-configure the image file, wherein automatic pre-configuration creates the image file and corresponding data for the image file. In Example 37, the system of Example 26, wherein the functional block is configured to automatically determine file dependencies by inspection of RPath, LD_Library_Path, RunPath, and system default locations and to optionally append user-identified files to the image file.

Example 38 is a non-transitory machine-readable medium containing instructions, which when executed by a processor, cause the processor to perform operations, the operations to: access, by a bootstrap logic circuitry of a first compute node associated with a user session, an image file of a global filesystem, the image file comprising a first set of one or more files associated with the user session and a second set of one or more files, the execution of the first set depending on the second set of one or more files; store, by the bootstrap logic circuitry, the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked filed comprising the first set of one more files and the second set of one more files; configure, by the bootstrap logic circuitry, a local filesystem service environment of the more than one compute node in the spanning tree, wherein the configured local file service environment is to identify a location in local memory of each of the unpacked files; and initiate, by the bootstrap logic circuitry after the image file is unpacked, execution of the local filesystem service in the more than one compute nodes of the spanning tree. In Example 39, the machine-readable medium of Example 38, further comprising operations to instruct, by the bootstrap logic circuitry, the local filesystem service in each compute node in the spanning tree, to install a filesystem service configuration to identify the first set of files and the second set of files as a local cache of the image file from the global filesystem. In Example 40, the machine-readable medium of Example 38, wherein operations to instruct, by the bootstrap logic circuitry, the local filesystem service to install a filesystem service configuration comprises operations to store the filesystem service configuration at a predetermined location, the filesystem service to automatically install the filesystem service configuration if located at the predetermined location. In Example 41, the machine-readable medium of Example 38, wherein operations to instruct, by the bootstrap logic circuitry, the local filesystem service to install a filesystem service configuration comprises operations to provide a location of the filesystem service configuration in a command line. In Example 42, the machine-readable medium of Example 38, wherein operations to instruct, by the bootstrap logic circuitry, the local filesystem service to install a filesystem service configuration comprises operations to provide the filesystem service configuration within a command. In Example 43, the machine-readable medium of Example 38, further comprising operations to initiate the bootstrap logic circuitry by execution of a bootstrapper executable on the unpacked files. In Example 44, the machine-readable medium of Example 38, wherein operations to configure, by the bootstrap logic circuitry, a local environment comprise operations to configure the LD_Library_Path and Path environment variables. In Example 45, the machine-readable medium of Example 38, wherein operations to initiate, by the bootstrap logic circuitry, execution of the local filesystem comprises operations to execute a filesystem service executable. In Example 46, the machine-readable medium of Example 38, wherein the local data storage comprises a random-access memory (RAM) disk. In Example 47, the machine-readable medium of Example 38, wherein the one or more compute nodes comprise nodes of a high-performance computing (HPC) system. In Example 48, the machine-readable medium of Example 38, further comprising operations to automatically pre-configure the image file, wherein automatic pre-configuration creates the image file and corresponding data for the image file. In Example 49, the machine-readable medium of Example 38, further comprising operations to automatically, by a pre-configuration logic circuitry, determine file dependencies by inspection of RPath, LD_Library_Path, RunPath, and system default locations and to optionally append user-identified files to the image file.

Example 50 is an apparatus to access shared files, the apparatus comprising: a means for accessing, by a first compute node associated with a user session, an image file of a global filesystem, the image file comprising a first set of one or more files associated with the user session and a second set of one or more files, the execution of the first set depending on the second set of one or more files; a means for storing, by the first compute node, the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked filed comprising the first set of one more files and the second set of one more files; a means for configuring, by the first compute node, a local filesystem service environment of the more than one compute node in the spanning tree, wherein the configured local file service environment is to identify a location in local memory of each of the unpacked files; and a means for initiating, by the first compute node after the image file is unpacked, execution of the local filesystem service in the more than one compute nodes of the spanning tree. In Example 51, the apparatus of Example 50, further comprising a means for instructing, by the first compute node, the local filesystem service in each compute node in the spanning tree, to install a filesystem service configuration to identify the first set of files and the second set of files as a local cache of the image file from the global filesystem. In Example 52, the apparatus of Example 50, wherein the means for instructing, by the first compute node, the local filesystem service to install a filesystem service configuration comprises storing the filesystem service configuration at a predetermined location, the filesystem service to automatically install the filesystem service configuration if located at the predetermined location. In Example 53, the apparatus of Example 50, wherein the means for instructing, by the first compute node, the local filesystem service to install a filesystem service configuration comprises a means for providing a location of the filesystem service configuration in a command line. In Example 54, the apparatus of Example 50, wherein the means for instructing, by the first compute node, the local filesystem service to install a filesystem service configuration comprises a means for providing the filesystem service configuration within a command. In Example 55, the apparatus of Example 50, further comprising the means for initiating the bootstrap logic circuitry by execution of a bootstrapper executable on the unpacked files. In Example 56, the apparatus of Example 50, wherein the means for configuring, by the first compute node, a local environment comprises a means for configuring the LD_Library_Path and Path environment variables. In Example 57, the apparatus of Example 50, wherein the means for initiating, by the first compute node, execution of the local filesystem comprises a means for executing a filesystem service executable. In Example 58, the apparatus of Example 50, wherein the local data storage comprises a random-access memory (RAM) disk. In Example 59, the apparatus of Example 50, wherein the one or more compute nodes comprise nodes of a high performance computing (HPC) system. In Example 60, the apparatus of Example 50, further comprising a means for automatically pre-configuring the image file, wherein automatic pre-configuration creates the image file and corresponding data for the image file. In Example 61, the apparatus of Example 50, further comprising a means for automatically, by a pre-configuration logic circuitry, determining file dependencies by inspection of RPath, LD_Library_Path, RunPath, and system default locations and to optionally append user-identified files to the image file.

What is claimed is:

1. An apparatus to access shared files, the apparatus comprising:
   memory: and
   logic circuitry to:
   access an image file of a global filesystem by a master compute node, the image file comprising a first set of one or more files associated with a user session and a second set of one or more files, the execution of the first set depending on the second set of one or more files;
   store the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked files comprising the first set of one or more files and the second set of one or more files;
   configure one or more environment variables of a local filesystem service environment of the more than one compute node in the spanning tree, wherein the configured one or more environment variables of the local file service environment is to identify a location in local memory of each of the unpacked files; and
   initiate, after the image file is unpacked, execution of a local filesystem service in the more than one compute nodes of the spanning tree.

2. The apparatus of claim 1, wherein the logic circuitry is configured to instruct the local filesystem service in each compute node in the spanning tree, to install a filesystem service configuration to identify the first set of files and the second set of files as a local cache of the image file from the global filesystem.

3. The apparatus of claim 1, wherein the logic circuitry is configured to initiate a bootstrap logic circuitry by execution of a bootstrapper executable on the unpacked files.

4. The apparatus of claim 1, wherein the one or more compute nodes comprise nodes of a high-performance computing (HPC) system.

5. The apparatus of claim 1, wherein the logic circuitry is configured to automatically pre-configure the image file, wherein automatic pre-configuration creates the image file and corresponding data for the image file.

6. A method to access shared files, the method comprising:
   accessing, by a bootstrap logic circuitry of a master compute node associated with a user session, an image file of a global filesystem, the image file comprising a first set of one or more files associated with the user session and a second set of one or more files, the execution of the first set depending on the second set of one or more files;
   storing, by the bootstrap logic circuitry, the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked files comprising the first set of one or more files and the second set of one or more files;
   configuring, by the bootstrap logic circuitry, one or more environment variables of a local filesystem service environment of the more than one compute node in the spanning tree, wherein the configured one or more environment variables of the local file service environment is to identify a location in local memory of each of the unpacked files; and
   initiating, by the bootstrap logic circuitry after the image file is unpacked, execution of a local filesystem service in the more than one compute nodes of the spanning tree.

7. The method of claim 6, further comprising instructing, by the bootstrap logic circuitry, the local filesystem service in each compute node in the spanning tree, to install a filesystem service configuration to identify the first set of files and the second set of files as a local cache of the image file from the global filesystem.

8. The method of claim 7, wherein instructing, by the bootstrap logic circuitry, the local filesystem service to install a filesystem service configuration comprises storing the filesystem service configuration at a predetermined location, the filesystem service to automatically install the filesystem service configuration if located at the predetermined location.

9. The method of claim 7, wherein instructing, by the bootstrap logic circuitry, the local filesystem service to install a filesystem service configuration comprises providing a location of the filesystem service configuration in a command line.

10. The method of claim 7, wherein instructing, by the bootstrap logic circuitry, the local filesystem service to install a filesystem service configuration comprises providing the filesystem service configuration within a command.

11. The method of claim 6, wherein configuring, by the bootstrap logic circuitry, the local environment comprises configuring the LD_LIBRARY_PATH and PATH environment variables.

12. A system to access shared files, the system comprising:
   more than one compute nodes coupled, wherein one of the compute nodes comprises a functional block of a root compute node to:
      access an image file of a global filesystem, the image file comprising a first set of one or more files associated with a user session and a second set of one or more files, the execution of the first set depending on the second set of one or more files;
      store the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked files comprising the first set of one or more files and the second set of one or more files;
      configure one or more environment variables of a local filesystem service environment of the more than one compute node in the spanning tree, wherein the configured one or more environment variables of the local file service environment is to identify a location in local memory of each of the unpacked files; and
      initiate, after the image file is unpacked, execution of a local filesystem service in the more than one compute nodes of the spanning tree.

13. The system of claim 12, wherein the functional block is configured to instruct the local filesystem service in each compute node in the spanning tree, to install a filesystem service configuration to identify the first set of files and the second set of files as a local cache of the image file from the global filesystem.

14. The system of claim 13, wherein the functional block is configured to initiate a bootstrap logic circuitry by execution of a bootstrapper executable on the unpacked files.

15. The system of claim 13, wherein the functional block is configured to execute a filesystem service executable.

16. The system of claim 13, wherein the functional block is configured to automatically pre-configure the image file, wherein automatic pre-configuration creates the image file and corresponding data for the image file.

17. A non-transitory machine-readable medium containing instructions, which when executed by a processor, cause the processor to perform operations, the operations to:
   access, by a bootstrap logic circuitry of a master compute node associated with a user session, an image file of a global filesystem, the image file comprising a first set of one or more files associated with the user session and a second set of one or more files, the execution of the first set depending on the second set of one or more files;
   store, by the bootstrap logic circuitry, the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked files comprising the first set of one or more files and the second set of one or more files;

configure, by the bootstrap logic circuitry, one or more environment variables of a local filesystem service environment of the more than one compute node in the spanning tree, wherein the configured one or more environment variables of the local file service environment is to identify a location in local memory of each of the unpacked files; and initiate, by the bootstrap logic circuitry after the image file is unpacked, execution of a local filesystem service in the more than one compute nodes of the spanning tree.

18. The machine-readable medium of claim 17, further comprising operations to instruct, by the bootstrap logic circuitry, the local filesystem service in each compute node in the spanning tree, to install a filesystem service configuration to identify the first set of files and the second set of files as a local cache of the image file from the global filesystem.

19. The machine-readable medium of claim 17, wherein operations to instruct, by the bootstrap logic circuitry, the local filesystem service to install a filesystem service configuration comprises operations to store the filesystem service configuration at a predetermined location, the filesystem service to automatically install the filesystem service configuration if located at the predetermined location.

20. The machine-readable medium of claim 17, wherein operations to instruct, by the bootstrap logic circuitry, the local filesystem service to install a filesystem service configuration comprises operations to provide a location of the filesystem service configuration in a command line.

21. The machine-readable medium of claim 17, wherein operations to instruct, by the bootstrap logic circuitry, the local filesystem service to install a filesystem service configuration comprises operations to provide the filesystem service configuration within a command.

22. An apparatus to access shared files, the apparatus comprising:

a means for accessing, by a master compute node associated with a user session, an image file of a global filesystem, the image file comprising a first set of one or more files associated with the user session and a second set of one or more files, the execution of the first set depending on the second set of one or more files;

a means for storing, by the master compute node, the image file in local data storage of more than one compute node of a spanning tree, the spanning tree of compute nodes comprising one or more compute nodes associated with the user session, wherein the image file is unpacked into a plurality of unpacked files based on data for the image file in the more than one compute nodes of the spanning tree, the unpacked files comprising the first set of one or more files and the second set of one or more files;

a means for configuring, by the master compute node, one or more environment variables of a local filesystem service environment of the more than one compute node in the spanning tree, wherein the configured one or more environment variables of the local file service environment is to identify a location in local memory of each of the unpacked files; and a means for initiating, by the master compute node after the image file is unpacked, execution of a local filesystem service in the more than one compute nodes of the spanning tree.

23. The apparatus of claim 22, further comprising a means for instructing, by the master compute node, the local filesystem service in each compute node in the spanning tree, to install a filesystem service configuration to identify the first set of files and the second set of files as a local cache of the image file from the global filesystem.

24. The apparatus of claim 22, wherein the local data storage comprises a random-access memory (RAM) disk.

25. The apparatus of claim 22, further comprising a means for automatically pre-configuring the image file, wherein automatic pre-configuration creates the image file and corresponding data for the image file.

* * * * *